United States Patent
Maeda et al.

(10) Patent No.: US 8,031,241 B2
(45) Date of Patent: Oct. 4, 2011

(54) SOLID-STATE IMAGING DEVICE AND IMAGING APPARATUS

(75) Inventors: Noriya Maeda, Kanagawa (JP); Hideo Nakayama, Nagasaki (JP); Kenichi Okumura, Kanagawa (JP); Nozomu Takatori, Nagasaki (JP)

(73) Assignee: Sony Corporation, Tokyo (JP)

( * ) Notice: Subject to any disclaimer, the term of this patent is extended or adjusted under 35 U.S.C. 154(b) by 587 days.

(21) Appl. No.: 12/115,949

(22) Filed: May 6, 2008

(65) Prior Publication Data

US 2009/0009635 A1 Jan. 8, 2009

(30) Foreign Application Priority Data

May 11, 2007 (JP) ................................ P2007-127099

(51) Int. Cl.
*H04N 5/217* (2011.01)
*H04N 5/335* (2011.01)

(52) U.S. Cl. ......................... 348/241; 348/294; 348/302

(58) Field of Classification Search .................... None
See application file for complete search history.

(56) References Cited

U.S. PATENT DOCUMENTS

| 6,963,367 | B1 * | 11/2005 | Hashimoto | 348/241 |
| 7,443,436 | B2 * | 10/2008 | Masuyama et al. | 348/294 |
| 7,741,593 | B2 * | 6/2010 | Iwata et al. | 250/214 R |
| 7,750,836 | B2 * | 7/2010 | Muramatsu et al. | 341/169 |

FOREIGN PATENT DOCUMENTS

| JP | 2004-248304 | 9/2004 |
| JP | 2007-036916 | 2/2007 |

* cited by examiner

*Primary Examiner* — Luong T Nguyen
(74) *Attorney, Agent, or Firm* — SNR Denton US LLP

(57) ABSTRACT

A solid-state imaging device includes a pixel array unit configured by arranging plural unit pixels including charge generating units and output transistors that output processing object signals corresponding to charges generated by the charge generating units, an imaging-condition determining unit that determines whether a large light-amount imaging condition, when an amount of light larger than that of light representing a saturation level is made incident on the charge generating units, is satisfied, and a control unit that performs control, on condition that the imaging-condition determining unit determines that the large light-amount imaging condition is satisfied, to correct an output signal based on processing object signals outputted from the unit pixels such that a harmful effect due to the large light-amount imaging condition is suppressed in the output signal.

5 Claims, 14 Drawing Sheets

<SECOND PROCESSING EXAMPLE: OPERATION PRINCIPLE IN FIRST EXAMPLE: DIFFERENTIAL PROCESSING IN UP-COUNT MODE>

Srst: SUBTRACTION ELEMENT
Ssig: ADDITION ELEMENT

<SECOND PROCESSING EXAMPLE: OPERATION PRINCIPLE IN SECOND EXAMPLE: DIFFERENTIAL PROCESSING IN DOWN-COUNT MODE>

Srst: ADDITION ELEMENT
Ssig: SUBTRACTION ELEMENT

FIG. 4B
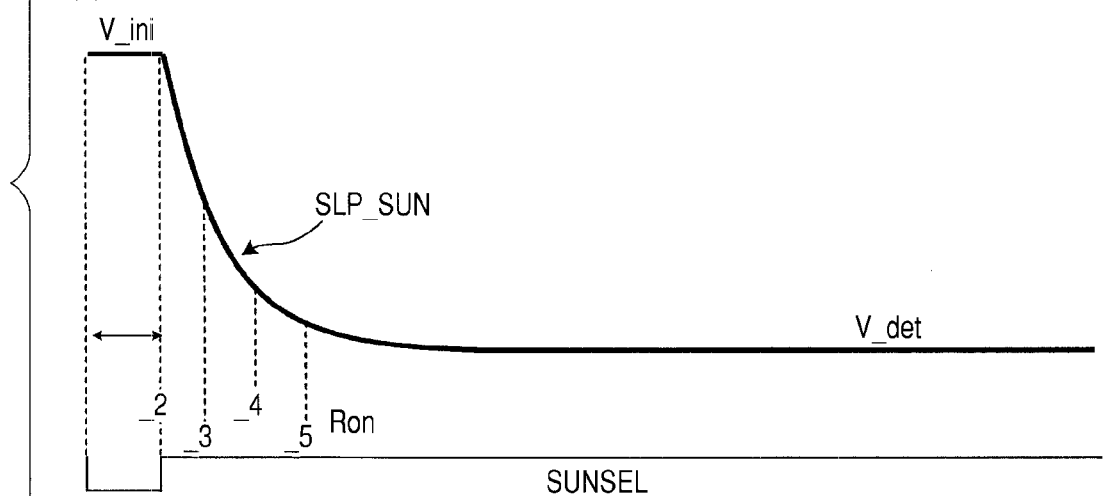
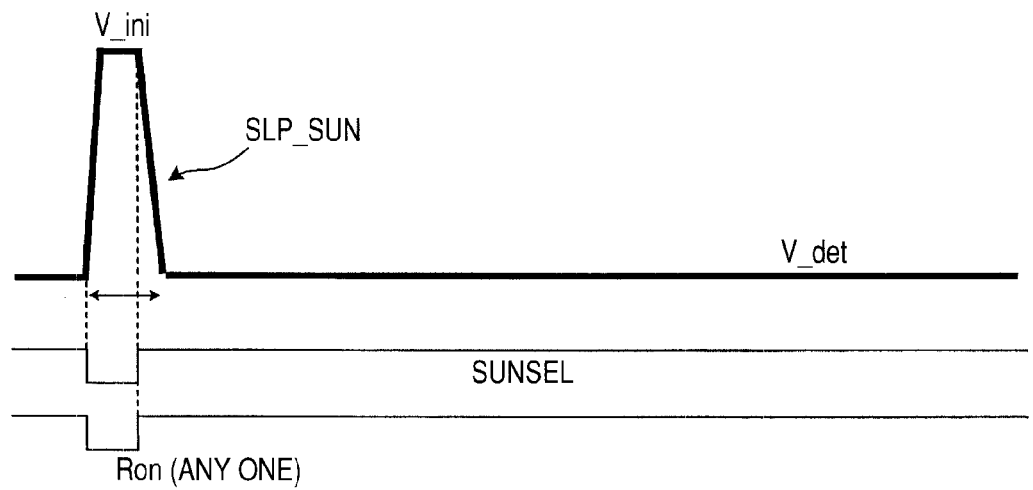

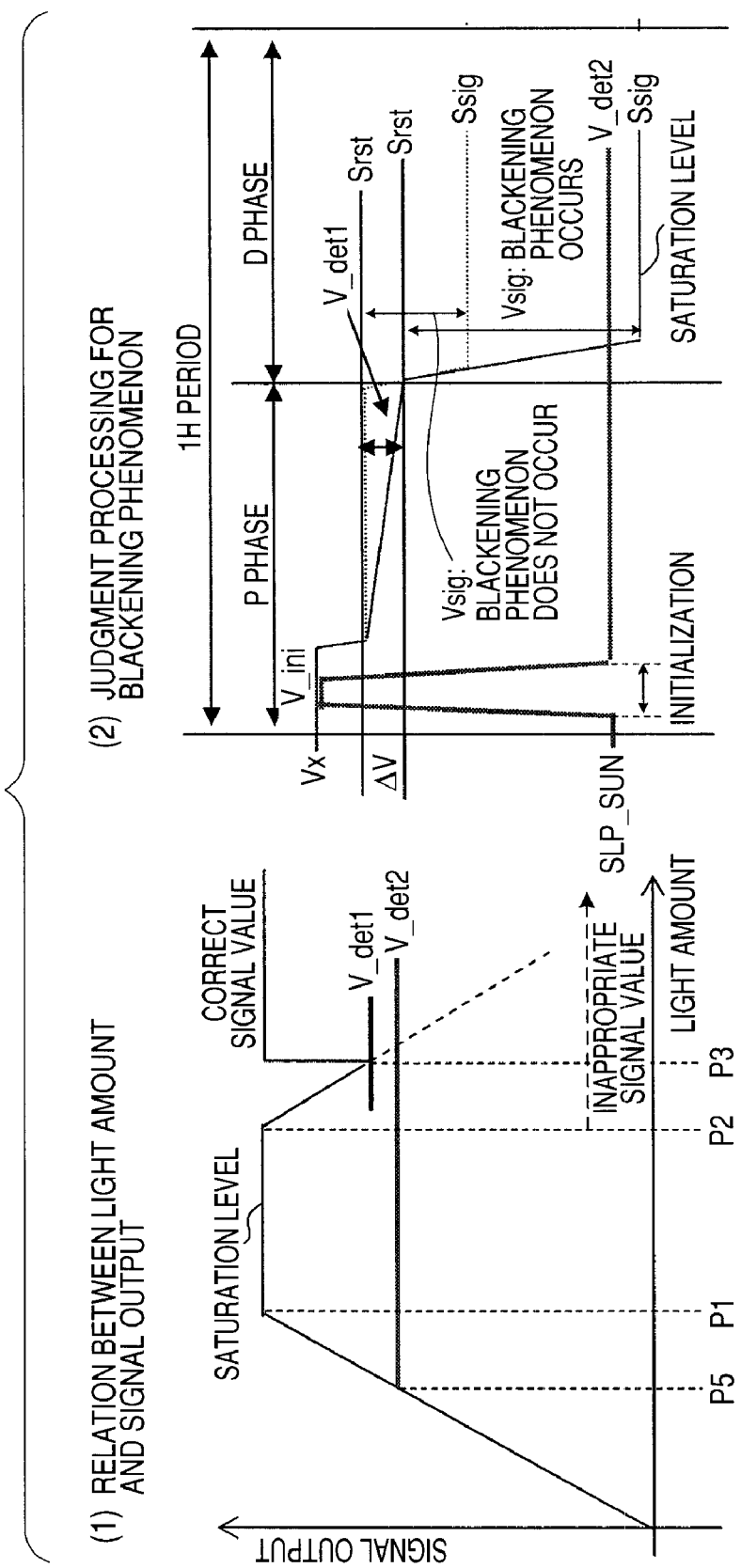

FIG. 7B
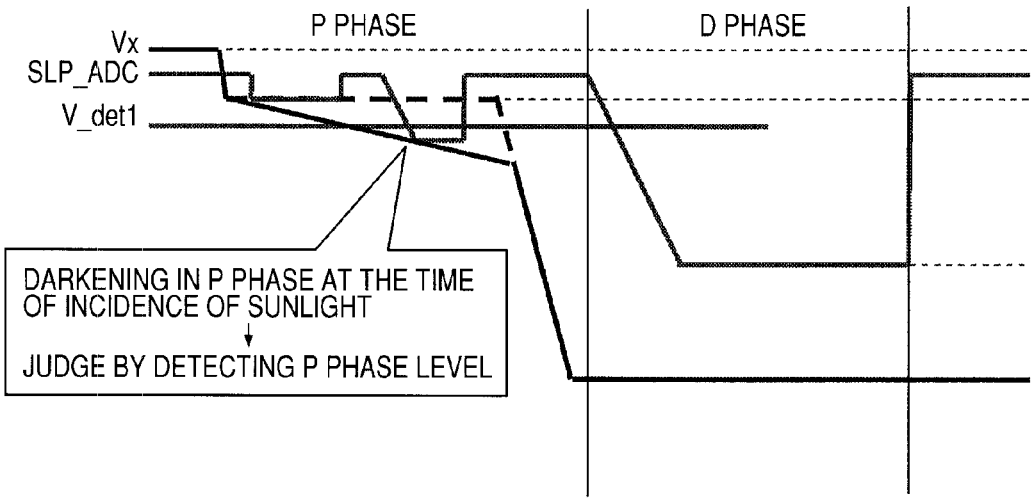
(1) JUDGE BLACKENING PHENOMENON AT P PHASE LEVEL
DARKENING IN P PHASE AT THE TIME OF INCIDENCE OF SUNLIGHT
↓
JUDGE BY DETECTING P PHASE LEVEL
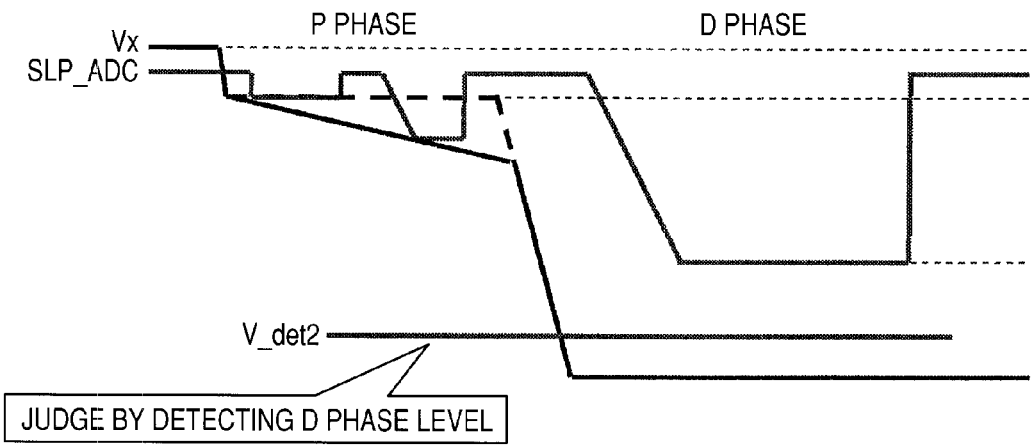
(2) JUDGE BLACKENING PHENOMENON AT D PHASE LEVEL
JUDGE BY DETECTING D PHASE LEVEL

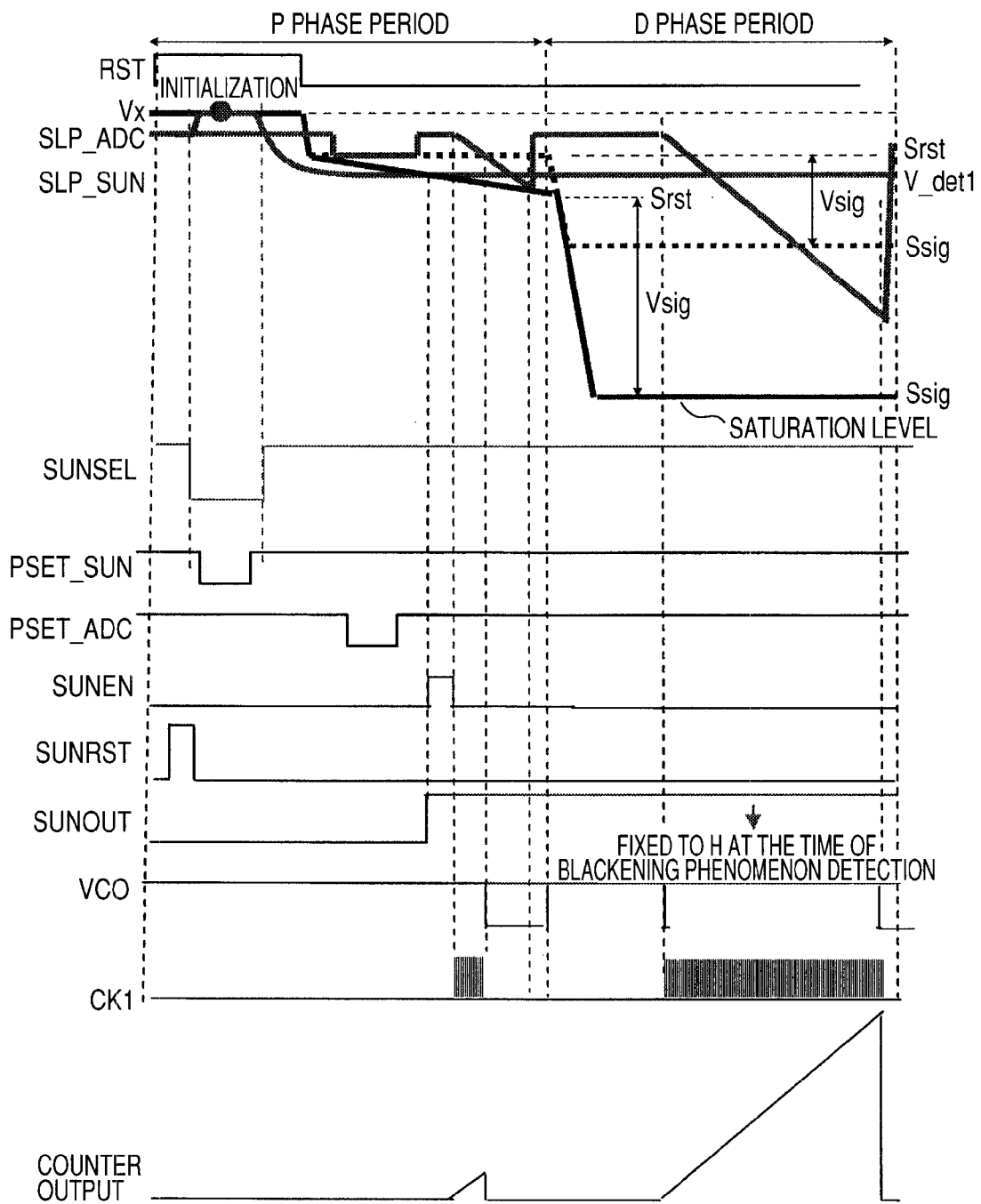

SOLID-STATE IMAGING DEVICE AND IMAGING APPARATUS

CROSS-REFERENCES TO RELATED APPLICATIONS

The present invention contains subject matter related to Japanese Patent Application JP 2007-127099 filed in the Japanese Patent Office on May 11, 2007, the entire contents of which being incorporated herein by reference.

BACKGROUND OF THE INVENTION

1. Field of the Invention

The present invention relates to a solid-state imaging device and an imaging apparatus, and, more particularly to a solid-state imaging device as an example of a semiconductor device for physical quantity distribution detection that is formed by arraying plural unit elements, which have sensitivity to an electromagnetic wave inputted from outside such as light and radiation, and is capable of selecting, with address control, a physical quantity distribution converted into an electric signal by the unit elements and reading out the physical quantity distribution as the electric signal and an imaging apparatus including a mechanism same as that of the solid-state imaging device.

2. Description of the Related Art

In recent years, as an example of solid-state imaging devices, MOS (Metal Oxide Semiconductor) and CMOS (Complementary Metal-oxide Semiconductor) image sensors that can overcome various problems of a CCD (Charge Coupled Device) image sensor attract attention.

The solid-state imaging devices are widely used in recent years as imaging devices mounted on various portable terminal apparatuses such as a cellular phone and as image input devices (imaging devices) of imaging apparatuses such as a digital still camera and a digital video camera.

For example, a CMOS image sensor has an amplifier circuit including a floating diffusion amplifier for each of pixels. In reading out a pixel signal, as an example of address control, a system called column parallel output type or column type is often used. The column parallel output type or column type system is a system for selecting one row in a pixel array unit, simultaneously accessing the pixels in the one row, and reading out pixel signals from the pixel array unit in row units, i.e., simultaneously in parallel for all the pixels in the one row.

A solid-state imaging device may perform differential processing between a noise level (a reset level) and a signal level in a pixel signal voltage in order to remove a noise component included in a pixel signal corresponding to a signal charge amount acquired by a charge generating unit (photoelectric conversion means). This makes it possible to extract a signal component without the noise component from which the reset signal as the noise component is removed.

However, it has been found that, under a certain imaging condition, harmful effects are caused by performing such differential processing. Specifically, under an imaging condition in which an amount of light larger than an amount of light at a saturation level, for example, a high luminance object such as the sun or a light is present in a subject, when the extremely intense light is made incident on the charge generating unit, a reset level Srst of a pixel signal voltage changes (e.g., falls) as time elapses (the change is represented as ΔV). A signal component corresponding to a signal charge amount acquired by the charge generating unit (the photoelectric conversion means) is superimposed on a level lower by ΔV than the original reset level Srst immediately after the stop of application of a reset pulse. As a result, a signal level Ssig falls regardless of the fact that the intense light is irradiated. The high luminance object in the subject is photographed as a black image and an image quality is deteriorated.

A likely cause of this phenomenon is as described below. When intense light is made incident on the charge generating unit and the signal level Ssig reaches the saturation level, the signal level Ssig does not rise exceeding the saturation level and a fixed level is outputted. On the other hand, when more intense light is made incident on the charge generating unit and the reset level Srst falls, since the reset level Srst falls while the signal level Ssig remains fixed at the saturation level. Therefore, substantially, the signal level Ssig represented by a difference "Ssig−Srst" between the signal level Ssig and the reset level Srst falls.

Since the difference "Ssig−Srst" decreases regardless of the fact that the intense light is made incident on the charge generating unit, an image looks black regardless of the fact that the light is very bright, i.e., a blackening phenomenon (also referred to as darkening phenomenon) occurs.

In order to avoid such a blackening phenomenon, a mechanism has been devised which determines whether a pixel signal voltage is in a state of the blackening phenomenon, for example, whether a signal level is in a saturating area or whether a reset level is in a changing area and, when the blackening phenomenon is detected, prevents information of the blackening phenomenon occurrence from being transmitted to a post-stage circuit (see, for example, JP-A-2004-248304 and JP-A-2007-036916).

SUMMARY OF THE INVENTION

However, it has been found that, when determining whether a blackening phenomenon occurs, if a reset level and a signal level of a pixel signal voltage are simply compared with a determination level, fluctuation in detection of the blackening phenomenon occurs because of fluctuation in the pixel signal voltage for each of pixels during pixel reset period.

Therefore, it is desirable to provide a mechanism that can reduce, when determining whether a blackening phenomenon occurs, the influence of fluctuation in the pixel signal voltage for each of pixels during pixel reset period.

According to an embodiment of the present invention, there is provided a solid-state imaging device and an imaging apparatus including a pixel array unit configured by arranging plural unit pixels including charge generating units and output transistors that output processing object signals corresponding to charges generated by the charge generating units, an imaging-condition determining unit that determines whether a large light-amount imaging condition, when an amount of light larger than that of a saturation level is incident on the charge generating units, is satisfied, and a control unit that performs, on condition that the imaging-condition determining unit determines that the large light-amount imaging condition is satisfied, an output signal correction based on processing object signals outputted from the unit pixels such that a harmful effect due to the large light-amount imaging condition is suppressed in the output signal.

The imaging-condition determining unit determines whether the large light-amount imaging condition is satisfied by comparing a determination level for determining whether the large light-amount imaging condition is satisfied and the processing object signals outputted from the unit pixels.

The determination level is set to a level suitable for each of the unit pixels such that, even if a pixel signal voltage due to resetting pixels fluctuates for each of the unit pixels, the influence can be reduced. To set the determination level to a proper level for each of the unit pixels, it is advisable to adjust the determination level according to a pixel signal voltage during pixel reset period. As an example, it is conceivable to set an initial value level of a reference signal, which has the initial value level and the determination level in time series, and the pixel signal voltage during pixel reset period to the same level.

A method of setting the determination level to a proper level for each of the unit pixels depends on a circuit configuration as well. For example, a comparing unit that compares both the reference signal, which has the initial level and the determination level in time series, and the pixel signal voltage can be set to short-circuit and initialize an input and an output when the reference signal is at the initial level. In this case, respective signals inputted to the comparing unit are capacitance-coupled.

The solid-state imaging device may be formed as one chip or may be a module-like form having an imaging function formed by collectively packaging an imaging unit and a signal processing unit or an optical system. The present invention is applicable not only to the solid-state imaging device but also to an imaging apparatus. When the present invention is applied to the imaging apparatus, the imaging apparatus obtains an effect same as that of the solid-state imaging device. The imaging apparatus refers to a camera or a portable apparatus having an imaging function. "Imaging" includes not only capturing of an image during normal camera photographing but also fingerprint detection and the like in a broader sense.

According to the embodiment of the present invention, the mechanism is adopted which determines whether the large light-amount imaging condition is satisfied and, when the large light-amount imaging condition is satisfied, corrects an output signal such that a harmful effect due to the large light-amount imaging condition is suppressed. In this case, the determination level for determining whether the large light-amount imaging condition is satisfied is set to the determination level suitable for each of the unit pixels. Consequently, even if the pixel signal voltage due to pixel reset fluctuates for each of the unit pixels, a result of determination on whether the large light-amount imaging condition is satisfied is less easily affected by the fluctuation.

BRIEF DESCRIPTION OF THE DRAWINGS

FIG. 4B is a diagram showing an example of the reference signal generated by the reference-signal generating unit;

FIG. 7A is a diagram for explaining a difference between determination of presence or absence of occurrence of a blackening phenomenon according to a P phase level and determination of presence or absence of occurrence of a blackening phenomenon according to a D phase level;

FIG. 7B is another diagram for explaining the difference between determination of presence or absence of occurrence of a blackening phenomenon according to the P phase level and determination of presence or absence of occurrence of the blackening phenomenon according to the D phase level;

FIG. 9 is a diagram showing a signal timing example in the determination of presence or absence of occurrence of the blackening phenomenon according to the P phase level.

DESCRIPTION OF THE PREFERRED EMBODIMENTS

Embodiments of the present invention will be hereinafter explained with reference to the accompanying drawings. In an example explained below, a CMOS solid-state imaging device, which is an example of an X-Y address type solid-state imaging device, is used as a device. It is assumed that, in the CMOs solid-state imaging device, all pixels include NMOSs.

Figure 1A:
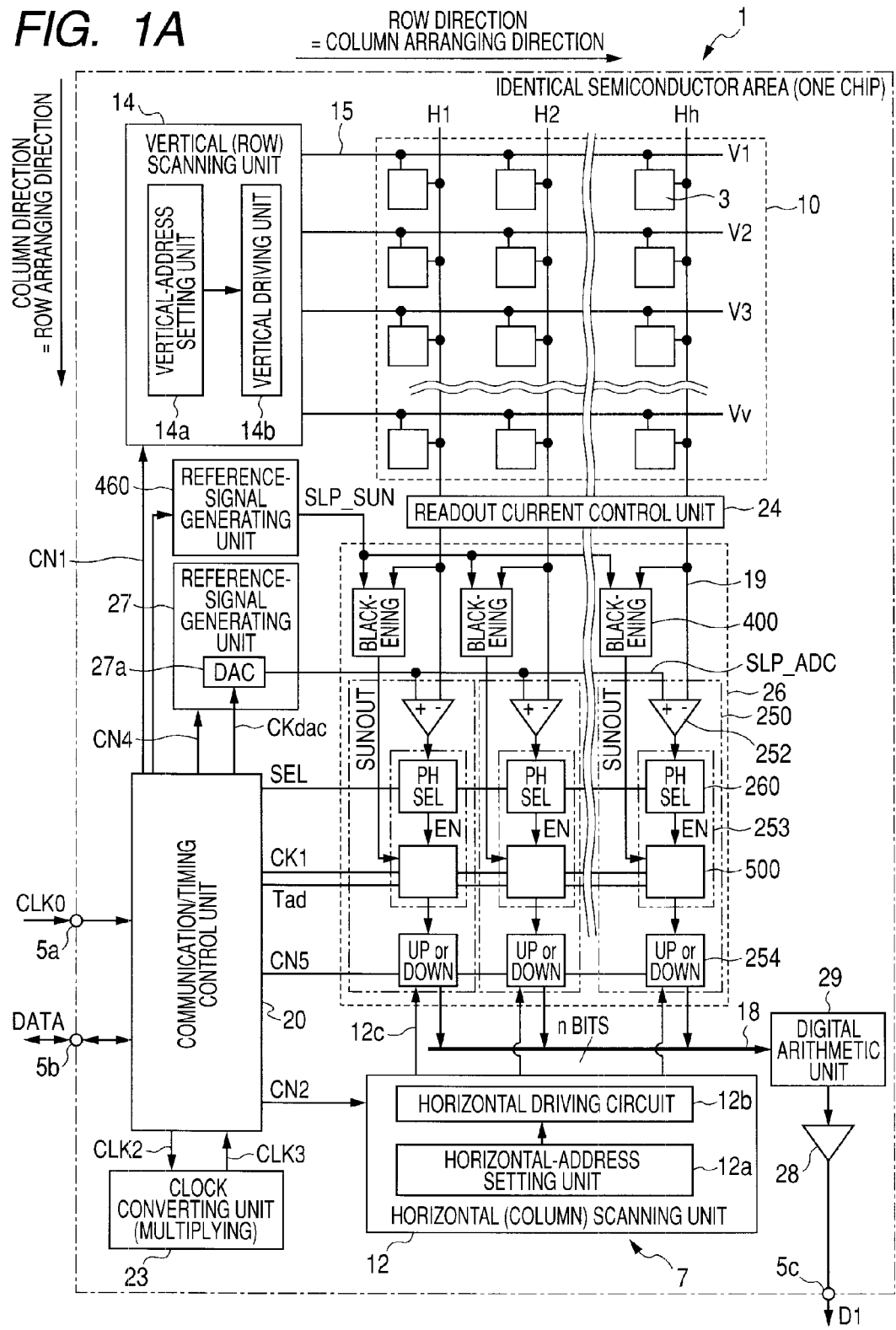
FIG. 1A is a schematic diagram of a CMOS solid-state imaging device as a solid-state imaging device according to an embodiment of the present invention.

However, this is only an example. A device to be used is not limited to a solid-state imaging device of a MOS type. All the embodiments described later can be applied in the same manner to all semiconductor devices for detecting a physical quantity distribution formed by arraying plural unit elements, which have sensitivity to an electromagnetic wave inputted from the outside such as light or radiation, in a line shape or a matrix shape Overview of a Solid-Stage Imaging Device First Embodiment FIG. 1A is a diagram showing a CMOS solid-state imaging device (a CMOS image sensor) as a solid-state imaging device according to an embodiment of the present invention.

A solid-imaging device 1 has a pixel unit in which plural pixels including light-receiving elements (an example of charge generating units), which output signals corresponding to an amount of incident light, are arrayed in rows and columns (i.e., in a two-dimensional matrix shape). Signal outputs from the respective pixels are voltage signals. The solid-state imaging device 1 is a solid-state imaging device of a column parallel output type in which CDS (Correlated Double Sampling) processing units, ADCs (Analog Digital Converters), and the like are provided in parallel columns.

As an AD conversion system, various systems have been considered with regard to a circuit size, processing speed (an increase in speed), resolution, and the like. As an example, there is an AD conversion system called a slope integration type or a ramp signal comparison type (in this specification, hereinafter referred to as reference-signal-comparison type) for comparing an analog unit signal with a so-called ramp-like reference signal SLP_ADC, a value of which gradually changes, for converting the unit signal into digital data and acquiring the digital data of the unit signal on the basis of a count value obtained by performing count processing in a count-operation-enabled period based on this comparison processing. The reference signal SLP_ADC only needs a waveform that generally changes in linearity with a certain tilt. The change may be a smooth slope-like change or may be a sequential step-wise change. It is possible to subject analog outputs from pixels to AD conversion in a low band by combining the AD conversion of the reference-signal-comparison type and that of the column parallel output type. Therefore, it can be said that the AD conversion system is suitable for an image sensor that realizes both a high image quality and a high speed.

All of plural function units may be arranged only on one edge side (an output side arranged on a lower side in the figure) in a column direction with respect to a pixel array unit 10 when the device is viewed in planar direction. Alternatively, the function units may be separately arranged on one edge side (the output side arranged on the lower side in the figure) in the column direction with respect to the pixel array unit 10 and the other edge side (an upper side in the figure) on the opposite side of the first edge side. In the latter case, it is advisable to separately arrange horizontal scanning units, which perform scanning in a row direction (horizontal scanning), on the respective edge side as well and allow the horizontal scanning units to operate independently from each other.

For example, as a typical example in which CDS processing units and digital conversion units are provided in parallel columns, there is a column type in which CDS processing units and other analog signal processing units and digital conversion units are provided for respective vertical columns in a portion called a column area provided on an output side of an imaging unit, signals are sequentially read out to the output side, and the vertical columns, the CDS processing units, the digital conversion units, and the like are connected in a one to one relation. The solid-state imaging device 1 is not limited to the column type (the column parallel type). It is also possible to adopt, for example, a form of allocating one CDS processing unit and one digital conversion unit to adjacent plural (e.g., two) vertical signal lines 19 (vertical columns) or a form of allocating one CDS processing unit and one digital conversion unit to N vertical signal lines 19 (vertical columns) at intervals of N lines (N is a positive integer; N−1 lines are arranged among N lines).

In all the forms except the column type, the plural vertical signal lines 19 (vertical columns) use one CDS processing unit and one digital conversion unit in common. Therefore, a switching circuit (a switch) for supplying pixel signals for plural columns, which are supplied from the pixel array unit 10 side, to one CDS processing unit and one digital conversion unit is provided. Depending on processing at a post-stage, measures such as providing a memory that stores an output signal are provided in extra.

In any case, by adopting, for example, the form of allocating one CDS processing unit and one digital conversion unit to the plural vertical signal lines 19 (the vertical columns), it is possible to simplify the structure in the respective unit pixels, to cope with an increase in pixels, and to realize a reduction in size, a reduction in cost, and the like of an image sensor, compared with a form of performing signal processing for respective pixel signals after reading out the pixel signals in pixel column units to perform the same signal processing in the respective unit pixels.

Pixel signals for one row can be simultaneously processed in parallel in plural signal processing units arranged in parallel columns. Therefore, the signal processing units can be actuated at low speed compared with the case in which processing is performed in one CDS processing unit and one digital conversion unit on the output circuit side and on the outside of the device. The form is advantageous in terms of power saving, band performance, noise, and the like. In other words, when power consumption, band performance, and the like are set the same, a high-speed operation of the entire sensor is possible.

In the case of the configuration of the column type, there is also an advantage that the signal processing units can be actuated at low speed, the configuration is advantageous in terms of power consumption, band performance, noise, and the like, and the switching circuit (the switch) is unnecessary. In the embodiment described below, the column type is adopted unless specifically noted otherwise.

As shown in FIG. 1A, the solid-state imaging device 1 according to this embodiment includes the pixel array unit 10 also referred to as a pixel unit, an imaging unit, and the like in which plural unit pixels 3 are arrayed in rows and columns, a driving control unit 7 provided on an outer side of the pixel array unit 10, a readout current control unit 24 that supplies an operation current (a readout current) for pixel signal readout to the unit pixels 3 of the pixel array unit 10, a column processing unit 26 having column AD circuits 250 arranged in respective vertical columns, a reference-signal generating unit 27 that supplies a reference signal SLP_ADC for AD conversion to the column processing unit 26, and an output circuit 28. The respective function units are provided on an identical semiconductor substrate.

As a characteristic of the solid-state imaging device 1 according to this embodiment, the column processing unit 26 includes blackening detecting units 400 arranged in the respective vertical columns and a reference-signal generating unit 460 that supplies a reference signal SLP_SUN for blackening level determination to each of the blackening detecting units 400 in the respective vertical columns. These function units are also provided on the semiconductor substrate on which the pixel array unit 10 is provided.

The blackening detecting units 400 are an example of imaging-condition determining units that determine, with the reference signal SLP_SUN set by the reference-signal generating unit 460 set as a condition for determining whether a blackening phenomenon occurs, whether a pixel signal voltage Vx (more specifically, a reset level Srst or a signal level Ssig) on the vertical signal lines 19 in columns of the blackening detecting units 400 satisfies a large light-amount imaging condition, when an amount of light larger than that of a saturation level is incident on a photoelectric conversion element.

A digital arithmetic unit 29 may be provided at a pre-stage of the output circuit 28 when necessary. "When necessary" means that, for example, differential processing between a reset component and a signal component is performed at a post-stage of the column AD circuits 250 rather than in the column AD circuits 250, correction of pixel data is performed when a blackening phenomenon is detected by the blackening detecting units 400, or multiply-accumulation processing for plural pixels concerning plural rows is performed in the column AD circuits 250.

When the AD conversion system of the reference-signal-comparison type is adopted, as an idea, it is also conceivable to provide reference-signal generating units 27 in parallel columns (in the respective pixel columns) as well. For example, comparators and reference signal generators are provided in the respective pixel columns and a value of a reference signal is sequentially changed by reference signal generators in columns corresponding to the pixel columns. However, this increases a circuit size and power consumption. Therefore, in this embodiment, the reference-signal generating unit 27 is used in common to all the columns, and the column AD circuits 250 in the respective pixel columns use in common the reference signal SLP_ADC generated from the reference-signal generating unit 27.

The column AD circuits 250 according to this embodiment have a function of an AD converting unit that converts a signal level (referred to as noise level or reset level Srst) immediately after pixel reset, which is a reference level of a pixel signal So (a pixel signal voltage Vx), and a signal level Ssig (corresponding to a received light amount) into digital data independent from each other.

By contriving a circuit configuration, it is also possible to give the column AD circuits 250 a function of a differential processing unit that acquires digital data Dsig of a signal component Vsig indicated by a difference between the reset level Srst and the signal level Ssig by executing differential processing between an AD conversion result of the reset level Srst and an AD conversion result of the signal level Ssig. In other words, the column AD circuits 250 not only have the AD conversion function but also can apply processing for calculating a difference between the reset level Srst and the signal level Ssig (equivalent to so-called CDS processing) to pixel signals in a voltage mode inputted via the vertical signal lines 19. Consequently, it is possible to remove noise signal components called fixed pattern noise (FPN) and reset noise.

The driving control unit 7 has a control circuit function for sequentially reading out signals of the pixel array unit 10. For example, the driving control unit 7 includes a horizontal scanning unit (a column scanning circuit) 12 having a horizontal-address setting unit 12a and a horizontal driving unit 12b that control a column address and column scanning, a vertical scanning unit (a row scanning circuit) 14 having a vertical-address setting unit 14a and a vertical driving unit 14b that control a row address and row scanning, and a communication/timing control unit 20 that has a function of, for example, generating an internal clock.

As indicated by a dotted line near the communication/timing control unit 20 in the figure, a clock converting unit 23 that is an example of a high-speed clock generating unit and generates a pulse having a clock frequency higher than an inputted clock frequency may be provided. The communication/timing control unit 20 generates an internal clock on the basis of an input clock (a master clock) CLK0 inputted via a terminal 5a and a high-speed clock generated by the clock converting unit 23.

It is possible to perform AD conversion processing and the like at high speed by using a signal formed by the high-speed clock generated by the clock converting unit 23. It is possible to perform, using the high-speed clock, motion extraction and compression processing that needs high-speed calculation. It is also possible to convert parallel data outputted from the column processing unit 26 into serial data and output video data D1 to the outside of the device. In this way, it is possible to output the video data D1 at high speed with terminals smaller in number than bits of AD-converted digital data.

The clock converting unit 23 incorporates a multiplying circuit that generates a pulse having a clock frequency higher than an inputted clock frequency. The clock converting unit 23 receives a low-speed clock CLK2 from the communication/timing control unit 20 and generates a clock having a frequency twice or more higher than that of the low-speed clock CLK2 on the basis of the low-speed clock CLK2. As the multiplying circuit of the clock converting unit 23, when k1 represents a multiple of the frequency of the low-speed clock CLK2, only a k1-multiplying circuit has to be provided. It is possible to use well-known various circuits.

In FIG. 1A, for simplification of illustration, a part of rows and columns are now shown. However, actually, several tens to several thousands unit pixels 3 are arranged in the respective rows and columns. The unit pixels typically include photodiodes as light-receiving elements (charge generating units), which are an example of detecting units, and intra-pixel amplifiers (an example of pixel-signal generating units) having semiconductor elements (e.g., transistors) for amplification.

In the solid-state imaging device 1, it is possible to adapt the pixel array unit 10 to color imaging by using color separation filters. In other words, color filters of any one of color separation filters, which are formed by a combination of color filters of plural colors for imaging color images, are provided in, for example, a so-called Bayer array on light-receiving surfaces on which an electromagnetic wave (in this example, light) is made incident to the respective charge generating units (photodiodes, etc.). In this way, the pixel array unit 10 is adapted to imaging of color images.

The unit pixels 3 are connected to the vertical scanning unit 14 and the column processing unit 26, in which the column AD circuits 250 are provided for the respective vertical columns, through row control lines 15 for row selection and the vertical signal lines 19, respectively. The row control lines 15 indicate wiring in general that enters the pixels from the vertical scanning unit 14.

The respective components of the driving control unit 7 such as the horizontal scanning unit 12 and the vertical scanning unit 14 are adapted to form, together with the pixel array unit 10, a part of the solid-state imaging device 1 both as a so-called one-chip component, which is integrally formed in a semiconductor area of a monocrystal silicon (provided on an identical semiconductor substrate) by using a technique same as the manufacturing technique of semiconductor integrated circuits, and as a CMOS image sensor, which is an example of a semiconductor system.

The solid-state imaging device 1 may be formed as one chip in which the respective units are integrally formed in the semiconductor area in this way. Alternatively, although not shown in the figure, the solid-state imaging device 1 may take a module-like form having an imaging function formed by collectively packaging, besides the various signal processing units such as the pixel array unit 10, the driving control unit 7, and the column processing unit 26, optical systems such as a photographing lens, an optical low-pass filter, and an infrared cut filter.

The horizontal scanning unit 12 and the vertical scanning unit 14 include, for example, decoders and start a shift operation (scanning) in response to control signals CN1 and CN2 given from the communication/timing control unit 20. Therefore, the row control lines 15 include various pulse signals for driving the unit pixels 3 (e.g., a pixel reset pulse for defining an initialization control potential, a transfer pulse TRG for defining a transfer control potential, and a vertical selection pulse VSEL).

Although not shown in the figure, the communication/timing control unit 20 includes a functional block of a timing generator TG (an example of a readout address control device) that supplies clocks necessary for operations of the respective units and a pulse signal of predetermined timing and a functional block of a communication interface that receives the master clock CLK0 supplied from a main control unit on the outside via the terminal 5*a*, receives data instructing an operation mode or the like supplied from the main control unit on the outside via a terminal 5*b*, and outputs data including information on the solid-state imaging device 1 to the main control unit on the outside.

For example, the communication/timing control unit 20 outputs a horizontal address signal to the horizontal-address setting unit 12*a* and outputs a vertical address signal to the vertical-address setting unit 14*a*. The address setting units 12*a* and 14*a* receive the address signals and select a row and a column corresponding to the address signals, respectively.

In this case, since the unit pixels 3 are arranged in a two-dimensional matrix shape, it is advisable to increase speed of reading out pixel signals and pixel data by performing (vertical) scanning for accessing and capturing, in row units (in parallel columns), analog pixel signals generated by the pixel-signal generating units 5 and outputted in the column direction through the vertical signal lines 19 and, then, performing (horizontal) scanning for accessing in the row direction, which is an arranging direction of the vertical columns, and reading out pixel signals (in this example, digitized pixel data) to an output side. It goes without saying that not only the scanning but also the random access for exclusively reading out information of necessary unit pixels 3 by directly designating addresses of unit pixels 3 desired to be read out is possible.

The communication/timing control unit 20 supplies a clock CLK1 having a frequency same as that of the input clock (the master clock) CLK0 inputted via the terminal 5*a*, a clock obtained by dividing the input clock CLK0 by two, and a low-speed clock obtained by further dividing the input clock CLK0 to the respective units in the device, for example, the horizontal scanning unit 12, the vertical scanning unit 14, and the column processing unit 26. In the following explanation, the clock obtained by dividing the input clock CLK0 by two and clocks having frequencies lower than that clock are also collectively referred to as low-speed clock CLK2.

The vertical scanning unit 14 selects a row of the pixel array unit 10 and supplies a necessary pulse to the row. For example, the vertical scanning unit 14 includes the vertical-address setting unit 14*a* that defines a readout row in the vertical direction (selects a row of the pixel array unit 10) and the vertical driving unit 14*b* that supplies a pulse to and drives the row control lines 15 for the unit pixels 3 on a readout address (in the row direction) defined by the vertical-address setting unit 14*a*. The vertical decoder 14*a* selects, other than a row from which a signal is read out (a readout row: also referred to as selected row or signal output row), for example, a row for an electronic shutter.

The horizontal scanning unit 12 selects the column AD circuits 250 of the column processing unit 26 in order in synchronization with the low-speed clock CLK2 and guides signals of the column AD circuits 250 to the horizontal signal lines (the horizontal output lines) 18. For example, the horizontal scanning unit 12 includes the horizontal-address setting unit 12*a* that defines a readout row in the horizontal direction (selects the respective column AD circuits 250 in the column processing unit 26) and the horizontal driving unit 12*b* that guides respective signals of the column processing unit 26 to the horizontal signal lines 18 in accordance with a readout address defined by the horizontal-address setting unit 12*a*.

The number of horizontal signal lines 18 is equal to the number of bits n (n is a positive integer) treated by the column AD circuits 250 or the number of bits twice as large as the number of bits n. For example, when the number of bits n is 10 bits, ten or twenty horizontal signal lines 18 are arranged according to the number of bits n. More specifically, when differential processing between a reset component and a signal component is performed in the column AD circuits 250, the number of horizontal signal lines 18 is set to the number of bits treated by the column AD circuits 250. On the other hand, when the differential processing between a reset component and a signal component is performed at a post-stage of the column AD circuits 250 (e.g., the digital arithmetic unit 29), n horizontal signal lines 18 for transmission of an AD conversion result of the reset component and n horizontal signal lines 18 for transmission of an AD conversion result of the signal component, i.e., 2n horizontal signal lines 18 in total are used.

In the solid-state imaging device 1 having such structure, pixel signals outputted from the unit pixels 3 are supplied, for the respective vertical columns, from the column processing unit 26 to the column AD circuits 250 through the vertical signal lines 19. The respective column AD circuits 250 of the column processing unit 26 receive analog signals So of the unit pixels 3 in columns corresponding thereto and process the analog signals So. For example, the respective column AD circuits 250 have ADC (Analog Digital Converter) circuits for converting the analog signals So into, for example, 10-bit digital data using, for example, the low-speed clock CLK2.

As AD conversion processing in the column processing unit 26, a method of AD-converting the analog signals So, which are held in parallel in row units, for the respective rows using the column AD circuits 250 provided for the respective columns is adopted. In this case, a method of the AD conversion of the reference-signal-comparison type is used. This method has a characteristic that, since AD converters are realized by the simple configuration, a circuit size is not increased even if the AD converters are provided in parallel.

In the AD conversion of the reference-signal-comparison type, a count-operation-enabled period (a signal indicating the period is referred to as count enable signal EN) is determined on the basis of time from conversion start (start of comparison processing) to conversion end (end of the comparison processing). An analog processing object signal is converted into digital data on the basis of the count enable signal EN.

As the count-operation-enabled period, when the differential processing between a reset level and a signal level is performed in the column AD circuits 250, for example, in general, it is possible to adopt a first processing example in which, at both periods of processing, the start of counting is set at a point when the reference signal SLP_ADC starts to change and the end of the counting is set at a point when the reference signal SLP_ADC and the processing object signal voltage coincide with each other. In this case, in the two periods of count processing for acquiring the digital data Dsig of the signal component Vsig of one pixel, the counter units 254 switch and perform a down-count operation and an up-count operation.

Alternatively, when the differential processing between a reset level and a signal level is performed in the column AD circuits 250, it is also possible to adopt a second processing example in which, in any one of the two periods of processing, the start of counting is set at a point when the reference signal SLP_ADC starts to change and the end of the counting is set at a point when the reference signal SLP_ADC and the processing object signal voltage coincide with each other but, in the other of the two periods of processing, the start of counting is set at a point when the reference signal SLP_ADC and the processing object signal voltage coincide with each other and the end of the counting is set at a point when the counting reaches a desired count number in that counting (typically, a point when the processing reaches a maximum AD conversion period). In this case, in the two periods of count processing, the counter units 254 have to perform only one of the down-count operation and the up-count operation.

On the other hand, when differential processing between a reset component and a signal component is performed at the post-stage of the column AD circuits 250 (e.g., the digital arithmetic unit 29), it is also possible to adopt a third processing example. In the third processing example, at both the two periods of processing, the start of counting is set at a point when the reference signal SLP_ADC starts to change and the end of the counting is set at a point when the reference signal SLP_ADC and the processing object signal voltage coincide with each other or the start of counting is set at a point when the reference signal SLP_ADC and the processing object signal voltage coincide with each other and the end of the counting is set at a point when the counting reaches a desired count number in that counting (typically, a point when the processing reaches a maximum AD conversion period). In this case, in the two periods of count processing, the counter units 254 have to perform only one of the down-count operation and the up-count operation.

In all the processing examples, in principle, the ramp-like reference signal SLP_ADC is supplied to the comparators (the voltage comparators), the analog pixel signal voltage inputted through the vertical signal lines 19 is compared with the reference signal SLP_ADC, and, when the count-operation-enabled period comes, counting in clock signals is started, whereby the number of clocks in the designated count-operation-enabled period is counted to perform the AD conversion.

<Details of the Reference-Signal Generating Unit and the Column AD Circuits>

The reference-signal generating unit 27 includes a digital analog converter (DAC) 27a. The reference-signal generating unit 27 generates a step-like sawtooth wave (a ramp waveform; hereinafter referred to as reference signal SLP_ADC as well) from an initial value indicated by control data CN4 from the communication/timing control unit 20 in synchronization with a count clock CKdac and supplies the step-like sawtooth wave reference signal SLP_ADC to the respective AD circuits 250 of the column processing unit 26 as a reference voltage (an ADC reference signal) for AD conversion. Although not shown in the figure, it is advisable to provide a filter for noise prevention. The count clock CKdac may be identical with a count clock CK1 for the counter unit 254.

For example, with a high-speed clock generated on the basis of a multiplying clock generated by the multiplying circuit set as a reference, the reference signal SLP_ADC can be changed at a higher speed than when the reference signal SLP_ADC is generated on the basis of the master clock CLK0 inputted via the terminal 5a.

The control data CN4 supplied from the communication/timing control unit 20 to the DA converter 27a of the reference-signal generating unit 27 includes information for equalizing a rate of change of digital data with respect to time such that the reference signal SLP_ADC in each comparison processing has basically the same tilt (a rate of change). Specifically, a count value is changed by 1 at each unit time in synchronization with the count clock CKdac and the count value is converted into a voltage signal by a DA converter of a current addition type.

The column AD circuits 250 include voltage comparing units (comparators) 252 that compare the reference signal SLP_ADC generated by the DA converter 27a of the reference-signal generating unit 27 and analog pixel signals obtained from the unit pixels 3 through the vertical signal lines 19 (H1, H2, . . . , and Hh) for the respective row control lines 15 (V1, V2, V3, . . . , and Vv) and counter units 254 that count time until completion of comparison processing by the voltage comparing units 252 and hold a result of the count. The column AD circuits 250 have an n-bit AD conversion function.

The column AD conversion circuits 250 have, between the voltage comparing units 252 and the counter units 254, count-operation control units 253 that control a period of count processing and an operation for holding the count data in the counter units 254. The count-operation control units 253 have count-phase switching units (PH SEL) 260 that control a period of count processing (a count-operation-enabled period TEN) in the counter units 254 and data-storage control units 500 that control a storage operation for count data. In the figure, the data-storage control units 500 are arranged at a post-stage of the count-phase switching units 260. However, depending on a circuit configuration, the count-phase switching units 260 can be arranged at a post-stage of the data-storage control units 500.

A count period control signal SEL for controlling a count period is supplied to the count-phase switching units 260 from the communication/timing control unit 20. Comparison pulses COMP are supplied to the count-phase switching units 260 from the voltage comparing units 252. The count-phase switching units 260 logically invert, on the basis of the count period control signal SEL, the comparison pulses COMP from the voltage comparing units 252 and pass the comparison pulses COMP to the counter units 254 as count enable signals EN (in opposite phases) (when necessary, via the data-storage control units 500). Alternatively, the count-phase switching units 260 directly pass the comparison pulses COMP to the counter units 254 as count enable signals EN (in the same phase) (when necessary, via the data-storage control units 500). The count-phase switching units 260 are an example of count-period control units that determine count periods.

For example, EX-OR (exclusive OR) gates are used as the count-phase switching units 260. The comparison pulses COMP are inputted to one input terminals and the count period control signal SEL is inputted to the other input terminals. In this case, the EX-OR gates logically invert the comparison pulses COMP into the count enable signals EN when the count period control signal SEL is at an H level and directly use the comparison pulses COMP as the count enable signals EN when the count period control signal SEL is at an L level.

As it is understood from this operation, the count-phase switching units 260 only have to have a function of determining whether the comparison pulses COMP should be logically inverted between the voltage comparing units 252 and the counter units 254. The count-phase switching units 260 can be designed in smaller area than components such as selectors used for respective bits when an up-down count function is provided in the counter units 254.

In column AD conversion processing in this embodiment, the reference signal SLP_ADC is supplied from the AD converter 27a in common to the voltage comparing units 252 arranged in the respective columns and, for the pixel signal voltage Vx processed by the respective voltage comparing units 252, the voltage comparing units 252 perform the comparison processing using the common reference signal SLP_ADC. The counter units 254 perform, using outputs of the count-phase switching units 260 as count enable signals EN, the count processing on the basis of the count clock CK1 when the count enable signals EN are at the H level and hold count results when the count processing is finished.

The communication/timing control unit 20 has a function of a control unit that controls the count period control signal SEL, which is supplied to the count-phase switching units 260 to switch a count period of count processing in the counter units 254, on the condition that the voltage comparing units 252 apply comparison processing to either of the reset level Vrst and the signal component Vsig of a pixel signal.

Besides the count period control signal SEL, a control signal CN5 for instructing other control information such as information on whether the counter units 254 perform two periods of count processing in a down-count mode or an up-count mode and setting and reset processing for an initial value Dini in the count processing of the first period, is inputted from the communication/timing control unit 20 to the count-phase switching units 260 and the counter units 254 of the respective column AD circuits 250.

A step-like reference signal SLP_ADC generated by the reference-signal generating unit 27 is inputted commonly to the first input terminals RAMP of the voltage comparing units 252. The vertical signal lines 19 corresponding to the vertical columns are connected to the second input terminals, and a pixel signal voltage from the pixel array unit 10 is inputted to the second input terminals, respectively. Output signals (comparison pulses COMP) of the voltage comparing units 252 are supplied to the count-phase switching units 260.

The count clock CK1 is inputted in common to clock terminals CK of the counter units 254 from the communication/timing control unit 20. Although a configuration of the counter units 254 is not shown in the figure, the counter units 254 can be realized by changing a wiring form of data storing units including latches to a synchronous counter format. The counter units 254 perform internal count with the input of one count clock CK1. Like the reference signal SLP_ADC, the multiplying clock (the high-speed clock) generated by the multiplying circuit can be used as the count clock CK1. In this case, higher resolution can be obtained than when the master clock CLK0 inputted via the terminal 5a is used.

In the case of the first processing example in which the counter units 254 switch the down-count operation and the up-count operation in the two periods of count processing for acquiring digital data Dsig of the signal component Vsig of one pixel, preferably, an up-down counter that can switch the down-count operation and the up-count operation is used.

On the other hand, in the cases of the second processing example and the third processing example in which the counter units 254 have only to perform just one of the down-count operation and the up-count operation in the two periods of count processing, only an up-count or a down-counter corresponding to the operation has to be used. However, in principle, it is also possible to utilize an up-down counter that can switch the down-count operation and the up-count operation to perform only one of the down-count operation and the up-count operation. However, usually, the up-down counter needs a circuit configuration for the mode switching. Compared with a configuration corresponding to only a single count mode of an up-counter and a down-counter, a circuit size is larger. Therefore, when the counter units 254 only have to perform either one of the down-count operation and the up-count operation, it is advisable not to adopt the up-down counter.

As the counter units 254, it is preferable to use asynchronous counters from which count output values are outputted without synchronizing with the count clock CK1. Basically, it is also possible to use synchronous counters. However, in the case of the synchronous counters, operations of all flip-flops (basic counter elements) are limited by the count clock CK1. Therefore, when a higher-frequency operation is required, as the counter units 254, it is preferable to use asynchronous counters suitable for a high-speed operation because an operation limiting frequency thereof is determined only by a limiting frequency of a first flip-flop (basic counter element).

Control pulses are inputted to the counter units 254 from the horizontal scanning unit 12 through the control lines 12c. The counter units 254 have a latch function of holding a count result. The counter units 254 hold counter output values until instructions by the control pulses are received through the control lines 12c. On output sides of the respective column AD circuits 250, according to the configuration in the first embodiment, outputs of the counter units 254 are directly connected to the horizontal signal lines 18.

In such a configuration, the column AD circuits 250 perform count operations in a predetermined pixel signal readout period and output count results at predetermined timing. First, the voltage comparing units 252 compare the reference signal SLP_ADC from the reference-signal generating unit 27 and the pixel signal voltage Vx inputted through the vertical signal lines 19. When the reference signal SLP_ADC and the pixel signal voltage Vx are the same, the voltage comparing units 252 invert the comparison pulses COMP (comparison outputs) of the voltage comparing units 252. For example, the voltage comparing units 252 set an H level of a power supply potential or the like as an inactive state and, when the pixel signal voltage Vx and the reference signal SLP_ADC coincide with each other, change to an L level (an active state).

The count-phase switching units 260 determine a count processing period in the counter units 254 on the basis of the comparison pulses COMP as results of comparison by the voltage comparing units 252 and the count period control signal SEL from the communication/timing control unit 20, and indicate the count processing period to the counter units 254 with the count enable signals EN. The counter units 254 latch (hold or store) a count number in the count processing period as pixel data to complete the AD conversion.

As described later in detail, when the blackening detecting units 400 detect that a predetermined imaging condition determined in advance is satisfied, specifically, the reset level Srst or the signal level Ssig of the pixel signal voltage Vx has reached a level of an imaging condition in which the blackening phenomenon occurs (the level is set according to the reference signal SLP_SUN generated by the reference-signal generating unit 460), blackening detection information SUNOUT is notified to the data-storage control units 500.

The data-storage control units 500 perform control such that data in a state in which blackening phenomenon occurs is not outputted from the output circuit 28. In other words, the data-storage control units 500 perform control to perform predetermined correction such that, in data outputted from the output circuit 28, a harmful effect due to a large light-amount imaging condition is suppressed. Therefore, the blackening detection information SUNOUT is supplied to the data-storage control units 500 from the blackening detecting units 400 in vertical columns corresponding thereto.

On condition that the blackening detecting units 400 as an example of the imaging-condition determining units determine that the large light-amount imaging condition is satisfied, the data-storage control units 500 perform predetermined data correction such that, in output data outputted from the output circuit 28 based on the pixel signal voltage Vx (more specifically, the reset level Srst and the signal level Ssig) outputted from the unit pixels, a harmful effect due to the large light-amount imaging condition is suppressed. For example, the data-storage control units 500 perform control such that, when intense light such as the sunlight is made incident, the output data can be converted into pixel data equivalent to the saturation level that can cause white dropout on a screen.

In this case, what kind of control the data-storage control units 500 apply to which function unit and what kind of correction processing the function unit controlled by the data-storage control unit 500 performs depend on whether the differential processing is performed in the column AD circuits 250 or performed in the post-stage circuits.

For example, in case that differential processing is performed in the column AD circuits 250, when the blackening detection information is received from the blackening detecting units 400, the data-storage control units 500 transfer the corrected pixel data with blackening phenomenon to the output circuit 28. Alternatively, the data-storage control units 500 notify the digital arithmetic unit 29 of the blackening detection information received from the blackening detecting units 400.

The "pixel data with blackening phenomenon corrected" may be, for example, data of a differential processing result between data corresponding to the maximum AD conversion period for both the reset level Srst and the signal level Ssig, or may be data Dsig for only the signal level Ssig for which the differential processing is not performed, or may correspond to data of the saturation level in a state in which blackening phenomenon does not occur. In any case, data in a state in which blackening phenomenon occurs is prevented from being transferred to the output circuit 28.

When the blackening detection information is received from the data-storage control units 500, the digital arithmetic unit 29 generates "pixel data with blackening phenomenon corrected". For example, the "pixel data with blackening phenomenon corrected" may correspond to data in the saturation level in a state in which blackening phenomenon does not occur.

On the other hand, when the differential processing is not performed in the column AD circuits 250 but is performed at the post-stage (e.g., in the digital arithmetic unit 29), the digital-storage control units 500 perform control, when the blackening detection information is received from the blackening detecting units 400, such that pixel data for which blackening phenomenon can be corrected in the digital arithmetic unit 29 or the like is transferred to the digital arithmetic unit 29.

The "pixel data for which blackening phenomenon can be corrected" may be, for example, data corresponding to the maximum AD conversion period for both the reset level Srst and the signal level Ssig (a maximum count number Drm corresponding to the maximum AD conversion period for the reset level Srst and a maximum count number Dsm corresponding to the maximum AD conversion period for the signal level Ssig). In this case, the digital arithmetic unit 29 performs the differential processing between data Drm and Dsm corresponding to the maximum AD conversion period for both the reset level Srst and the signal level Ssig to generate "pixel data with blackening phenomenon corrected".

Alternatively, the "pixel data for which blackening phenomenon can be corrected" may be the data Dsm for only the signal level Ssig for which the differential processing is not performed.

Although not specifically shown in the figure because the explanation of this embodiment is not directly related, other various signal processing circuits and the like may be included in components of the solid-state imaging device 1.

Overview of a Solid-State Imaging Device

Second Embodiment

Figure 1B:
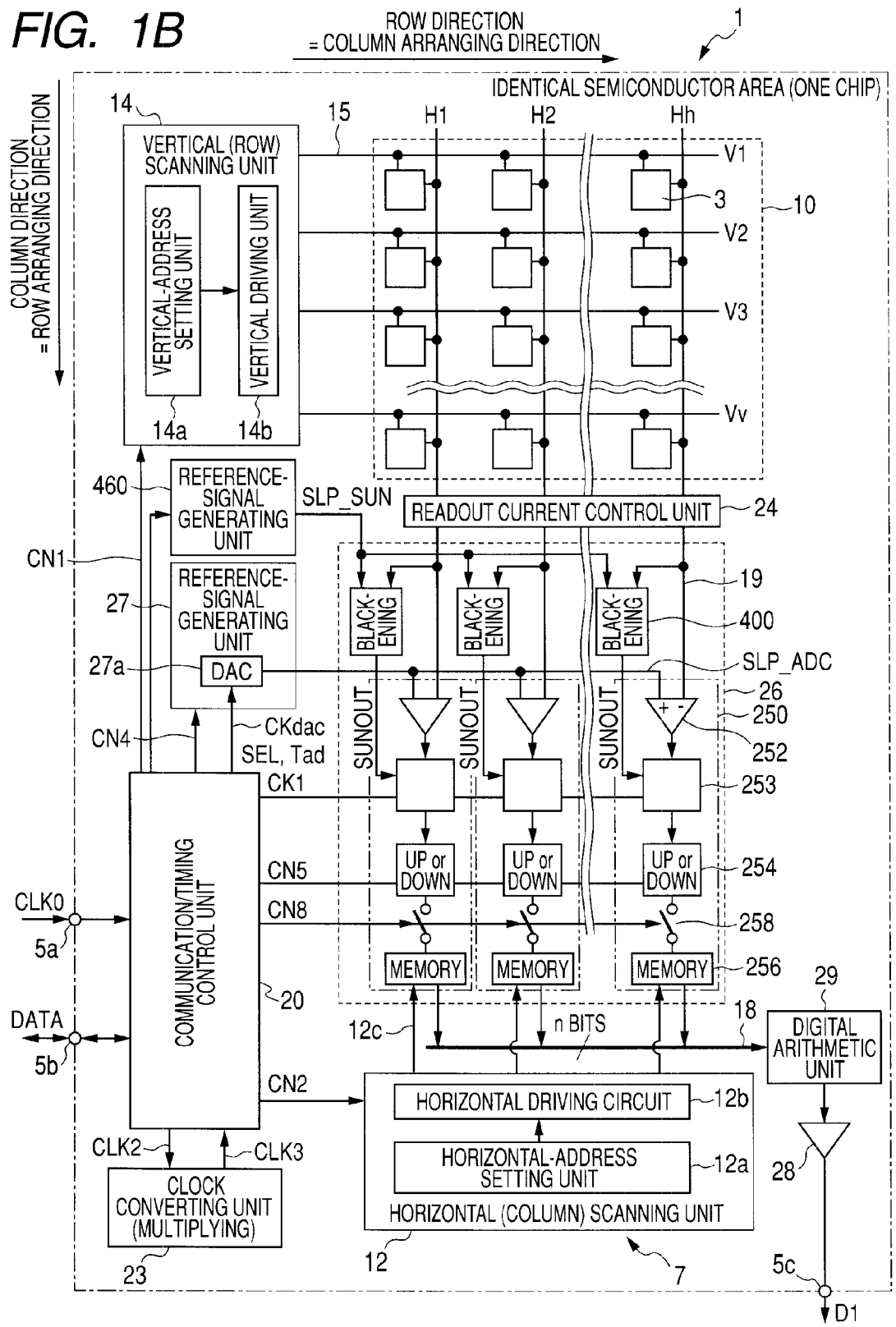
FIG. 1B is a schematic diagram of a CMOS solid-state imaging device as a solid-state imaging device according to a second embodiment of the present invention.

FIG. 1B is a diagram showing a CMOS solid-state imaging device (a CMOS image sensor) as a solid-state imaging device according to a second embodiment of the present invention. In the solid-state imaging device 1 according to the second embodiment, a configuration of the column AD circuits 250 is modified from that of the solid-state imaging device 1 according to the first embodiment.

The column AD circuits 250 according to the second embodiment include, at a post-sage of the counter units 254, data storing units 256 as n-bit memory devices that store count results held by the counter units 254 and switches 258 arranged between the counter units 254 and the data storing units 256.

When the column AD circuits 250 include the data storing units 256, a memory transfer instruction pulse CN8 as a control pulse is supplied in common to the switches 258 from the communication/timing control unit 20 at predetermined timing. When the memory transfer instruction pulse CN8 is supplied, the switches 258 transfer count values of the counter units 254 corresponding thereto to the data storing units 256. The data storing units 256 hold and store the transferred count values.

A mechanism for causing the data storing units 256 to hold the count values of the counter units 254 at the predetermined timing is not limited to the configuration in which the switches 258 are arranged between both the units. For example, it is also possible to realize the mechanism by controlling output-enable of the counter units 254 with the memory transfer instruction pulse CN8 while directly connecting the counter units 254 and the data storing units 256. It is also possible to realize the mechanism by using the memory transfer instruction pulse CN8 as a latch clock for determining data capturing timing of the data storing units 256.

Control pulses are inputted to the data storing units 256 from the horizontal scanning unit 12 through the control lines 12c. The data storing units 256 store the count values transferred from the counter units 254 until instructions by the control pulses are received through the control lines 12c.

The horizontal scanning unit 12 has a function of a scanning unit that reads out the count values stored by the respective data storing units 256 in parallel to processing performed by the respective voltage comparing units 252 and the respective counter units 254 of the column processing units 26.

Outputs of the data storing units 256 are connected to the horizontal signal lines 18. The horizontal signal lines 18 have signal lines for a n or 2n-bit width, which is a bit width of the column AD circuits 250, and are connected to the output circuit 28 through n or 2n sense circuits corresponding to not-shown respective output lines.

In particular, when the column AD circuits 250 include the data storing units 256, count results held by the counter units 254 can be transferred to the data storing units 256. Therefore, it is possible to control count operations of the counter units 254, i.e., AD conversion processing and an operation for reading out the count results to the horizontal signal lines 18 independently from each other. It is possible to realize a so-called pipeline operation for performing the AD conversion processing and an operation for reading out signals to the outside in parallel.

AD Conversion Processing Operation

Operations in the First Processing Example

Figure 2:
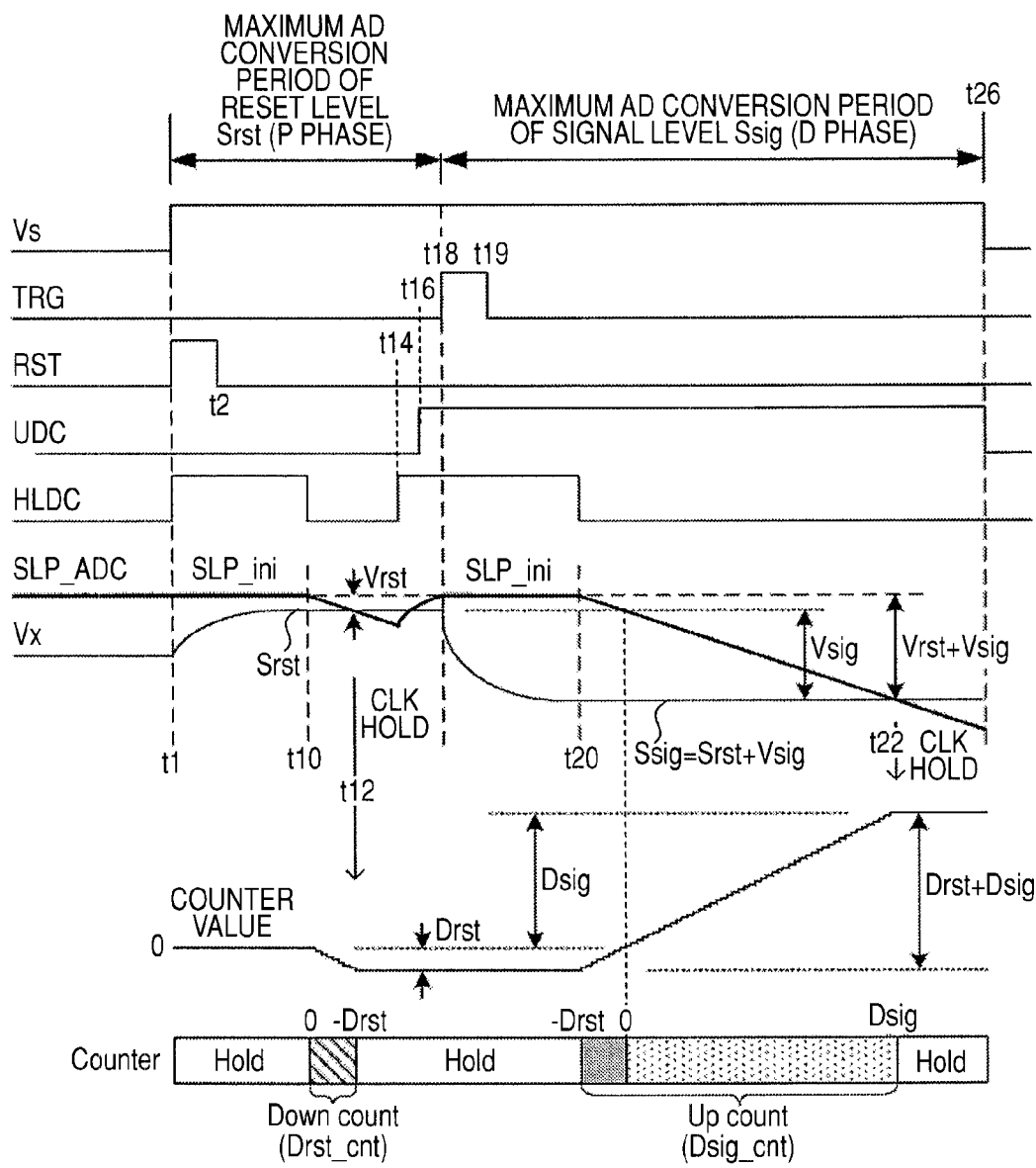
FIG. 2 is a timing chart for explaining operations in a first processing example of column AD conversion processing.

FIG. 2 is a timing chart for explaining operations in the first processing example of column AD conversion processing.

A mechanism for converting analog pixel signals detected by the respective unit pixels 3 of the pixel array unit 10 into digital data adopts, for example, a following method including: find a point where the reference signal SLP_ADC of a ramp waveform that falls at a predetermined tilt (or stepwise) and respective voltages of reference components and signal components according to pixel signals from the unit pixels 3 coincide with each other; count, with a count clock, time from a point when the reference signal SLP_ADC used in this comparison processing is generated (a change in the reference signal SLP_ADC starts) to a point when electric signals and reference signals corresponding to the reference components and the signal components in the pixel signals coincide with each other to thereby obtain count values of pixel signal levels corresponding to respective magnitudes of the reference components and the signal components.

In the pixel signal So (the pixel signal voltage Vx) outputted from the vertical signal lines 19, the signal level Ssig appears sequentially after the reset level Srst including noise of a pixel signal as a reference level. While the processing in the P phase is performed for the reference level (the reset level Srst, practically, equivalent to the reset level Vrst), the processing in the D phase processes the signal level Ssig obtained by adding the signal component Vsig to the reset level Srst.

Although detailed explanation is omitted, in the AD conversion processing of a common reference-signal-comparison type, first, during the initial processing period, i.e., in a processing period of a pre-charge phase (which may be abbreviated as P phase) that is an AD conversion period for the reset level Srst, the communication/timing control unit 20 firstly sets a reset control signal CLR to active H, resets count values of the respective flip-flops of the counter units 254 to an initial value "0", and sets the counter units 254 to the down-count mode (t1).

In this case, the communication/timing control unit 20 sets a data storage control pulse HLDC to active H and sets a count mode control signal UDC to a low level (i.e., the down-count mode). The communication/timing control unit 20 sets the unit pixels 3 to a reset potential (t1 to t2). The reset potential is outputted to the vertical signal lines 19 as the pixel signal So. Consequently, the reset level Srst appears on the vertical signal lines 19 as the pixel signal voltage Vx.

When the reset level Srst on the vertical signal lines 19 (H1, H2, . . . ) converges and stabilizes, the communication/timing control unit 20 uses, in order to cause the reference signal SLP_ADC to start to change simultaneously with the start of count operations in the counter units 254, the data storage control pulse HLDC as the control data CN4 and sets the data storage control pulse HLDC to inactive L (t10). In response to this, the reference-signal generating unit 27 inputs a step-like or linear voltage waveform generally changed with time in a sawtooth shape (a ramp shape), which has an initial voltage SLP_ini as a start point. The inputted voltage waveform is used as the reference signal SLP_ADC that is a reference voltage to one input terminals RAMP of the voltage comparing units 252. The voltage comparing units 252 compare the reference signal SLP_ADC and the pixel signal voltage Vx from the vertical signal lines 19 supplied from the pixel array unit 10.

Simultaneously with the input of the reference signal SLP_ADC to the input terminals RAMP of the voltage comparing units 252, comparison time in the voltage comparing units 252 is measured by the counter units 254 arranged for the respective rows in synchronization with the reference signal SLP_ADC outputted from the reference-signal generating unit 27. Actually, for generation of the reference signal SLP_ADC, the data storage control pulse HLDC is set to inactive L. The counter units 254 start down-count from the initial value "0" as the count operation in the P phase. In other words, the counter units 254 start count processing in a negative direction.

The voltage comparing units 252 compare the reference signal SLP_ADC from the reference-signal generating unit 27 and the pixel signal voltage Vx inputted through the vertical signal lines 19. When the reference signal SLP_ADC and the pixel signal voltage Vx are the same, the voltage comparing units 252 invert a comparison output to the counter units 254 from the H level to the L level. In response to this result, the counter units 254 stop the count operation substantially simultaneously with the inversion of the comparison output and latch (hold or store) a count value at that point (literally represented as "−Drst" with a minus sign) as a pixel data, therefore, completing the AD conversion. During processing in the P phase, the reset level Vrst at the pixel signal voltage Vx is detected by the voltage comparing units 252 and the count operations are performed in the counter units 254. Therefore, the reset level Vrst of the unit pixels 3 is read out and the AD conversion of the reset level Vrst is carried out.

When a predetermined down-count period passes, the communication/timing control unit 20 sets the data storage control pulse HLDC to active H (t14). Consequently, the reference-signal generating unit 27 stops the generation of the ramp-like reference signal SLP_ADC (t14) and returns to the initial voltage SLP_ini.

During the subsequent processing period, i.e., in a processing period in a data phase (which may be abbreviated as D phase) that is an AD conversion period for the signal level Ssig, the communication/timing control unit 20 reads out the signal component Vsig corresponding to an amount of incident light for each of the unit pixels 3 and performs operations same as those in the readout operation of the P phase. First, the communication/timing control unit 20 sets the count mode control signal UDC to the high level and sets the counter units 254 in the up-count mode (t16).

In this case, in the unit pixels 3, the communication/timing control unit 20 sets a transfer signal φTRG to active H while keeping a vertical selection signal φVSEL in a readout object row Vn in active H and reads out the signal level Ssig to the vertical signal lines 19 (t18 to t19). When the signal level Ssig on the vertical signal lines 19 (H1, H2, . . . ) converges and stabilizes, the communication/timing control unit 20 uses, in order to cause the reference signal SLP_ADC to start to change simultaneously with the start of count operations in the counter units 254, the data storage control pulse HLDC as the control data CN4 and sets the data storage control pulse HLDC to inactive L (t20).

In response to this, the reference-signal generating unit 27 inputs a step-like or linear voltage waveform generally changed with time in a sawtooth shape (a ramp shape), which has an initial voltage SLP_ini as a start point and has a tilt same as that in the P phase, as the reference signal SLP_ADC that is a comparison voltage to one input terminals RAMP of the voltage comparing units 252. The voltage comparing units 252 compare the reference signal SLP_ADC and the pixel signal voltage Vx on the vertical signal lines 19 supplied from the pixel array unit 10.

Simultaneously with the input of the reference signal SLP_ADC to the input terminals RAMP of the voltage comparing units 252, comparison time in the voltage comparing units 252 is measured by the counter units 254 arranged for the respective rows in synchronization with the reference signal SLP_ADC outputted from the reference-signal generating unit 27. As in the above case, actually, the data storage control pulse HLDC is set to inactive L for generation of the reference signal SLP_ADC. In a manner opposite to that in the P phase, the counter units 254 start down-count from the digital value Drst (a negative number) of the reset level Srst of the pixel signal voltage Vx, which is acquired during the readout and the AD conversion in the P phase. In other words, the counter units 254 start count processing in a positive direction.

The voltage comparing units 252 compare the ramp-like reference signal SLP_ADC from the reference-signal generating unit 27 and the pixel signal voltage Vx inputted through the vertical signal lines 19. When the reference signal SLP_ADC and the pixel signal voltage Vx are the same, the voltage comparing units 252 invert a comparison output to the counter units 254 from the H level to the L level (t22). In response to this result, the counter units 254 stop the count operation substantially simultaneously with the inversion of the comparison output and latch (hold or store) a count value at that point as pixel data to complete the AD conversion (t22).

When a predetermined down-count period passes, in the unit pixels 3, the communication/timing control unit 20 sets the vertical selection signal φVSEL in the readout object row Vn to inactive L, prohibits output of the pixel signal So to the vertical signal lines 19, and sets the vertical selection signal φVSEL to active H for the next readout object row Vn+1 (t26). In this case, the communication/timing control unit 20 prepares for processing for the next readout object row Vn+1. For example, the communication/timing control unit 20 sets the count mode control signal UDC to the low level and sets the counter units 254 in the up-down count mode. During the processing in the D phase, the signal level Ssig at the pixel signal voltage Vx is detected by the voltage comparing units 252 to perform the count operation. Therefore, the signal component Vsig of the unit pixels 3 is read out to carry out the AD conversion for the signal level Ssig.

The signal level Ssig is a level obtained by adding the signal component Vsig to the reset level Srst. Therefore, a count value of an AD conversion result of the signal level Ssig is basically "Drst+Dsig". However, since a start point of the up-count is "−Drst" that is an AD conversion result of the reset level Srst, a count value actually held is "−Drst+(Dsig+Drst)=Dsig".

In other words, the count operations in the counter units 254 have different count modes, i.e., the down-count during the processing in the P phase and the up-count during the processing in the D phase. Therefore, differential processing (subtraction processing) between a count number "−Drst" as the AD conversion result of the reset level Srst and a count number "Drst+Dsig" as the AD conversion result of the signal level Ssig is automatically performed in the counter units 254. A count number Dsig corresponding to a result of the differential processing is held in the counter units 254. The count number Dsig represents digital data corresponding to the signal component Vsig. The column AD circuits 250 operate not only as a digital conversion unit that converts an analog pixel signal into digital pixel data but also as a CDS (Correlated Double Sampling) processing unit.

When the column AD circuits 250 include the data storing units 256 at the post-stage of the counter units 254, a count result of the previous row Vx−1 can be transferred to the data storing units 256 on the basis of the memory transfer instruction pulse CN8 from the communication/timing control unit 20 before the operations of the counter units 254. In other words, after the end of the AD conversion period, the column AD circuits 250 save the data in the counter units 254 in the data storing units 256 and starts AD conversion for the next row Vx+1. The data in the data storing units 256 can be selected in order by the horizontal scanning unit 12 on the background and read out by using the output circuit 28.

As a significant characteristic of the AD conversion processing in the first processing example, in the count processing of the first period and the count processing of the second period for one pixel, the respective count operations are performed in the down-count processing in the P phase and performed in the up-count processing in the D phase, whereby, practically, count processing of complements is performed in the P phase and count processing of real numbers is performed in the D phase. Practically, the count processing of complements is count processing in the negative direction and can be regarded as a subtraction element. The count processing of real numbers is count processing in the positive direction and can be regarded as an addition element.

AD Conversion Processing Operation

Operations in the Second Processing Example:
Principle

Figure 3A:
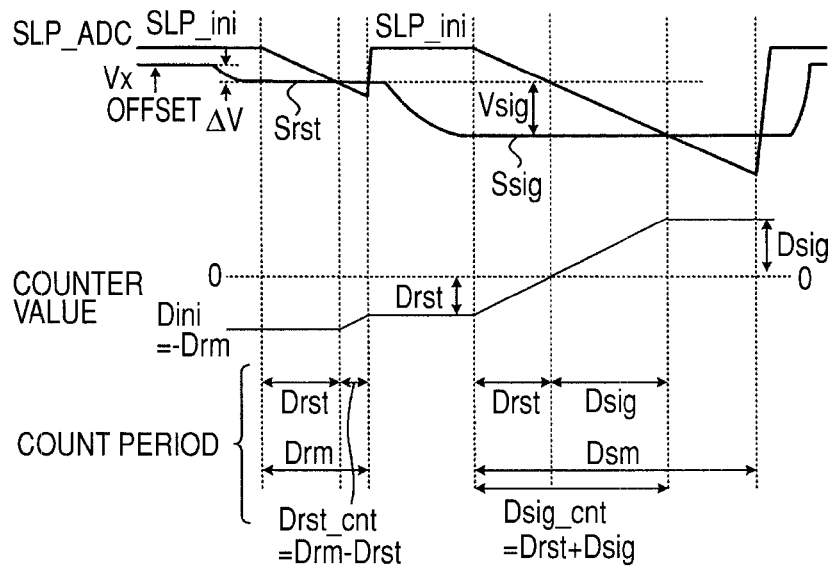
FIG. 3A is a diagram for explaining a first example of an operation principle of column AD conversion processing in a second processing example.
Figure 3B:
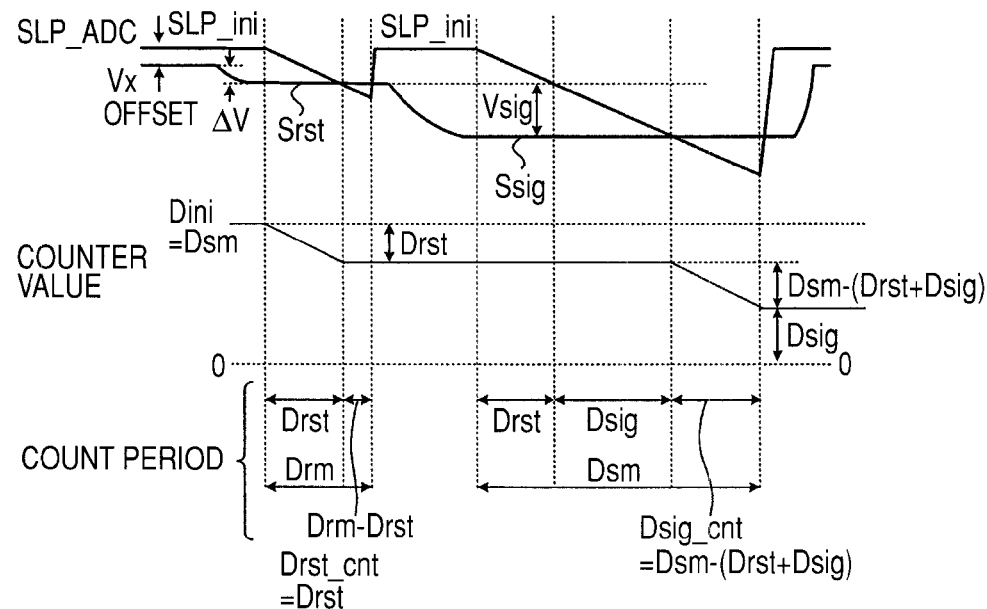
FIG. 3B is a diagram for explaining a second example of the operation principle of the column AD conversion processing in the second processing example.

FIGS. 3A and 3B are diagrams for explaining operations of column AD conversion processing in the second processing example. In the second processing example, when the AD conversion system of the reference-signal-comparison type is adopted, a mechanism that can simultaneously perform a differential processing function and AD conversion while suppressing a problem of an increase in area of the counter units 254 is adopted.

In terms of a circuit configuration, a mechanism for switching count modes is not adopted and a mechanism for performing counting in an identical count mode during the AD conversion processing of the first period and the second time and setting different count phases in the AD conversion processing of the first period and the second time is adopted. As in the first processing example, during count processing of the second period, count processing is started from a result of count processing of the first period.

"Setting different count phases" means that different count processing periods are set during the AD conversion processing of the first period (e.g., the processing in the P phase) and during the AD conversion processing of the second period (e.g., the processing in the D phase). More specifically, a difference between the count phases represents a difference between the count processing performed in a period from a point when the reference signal SLP_ADC starts to change to a point when the reference signal SLP_ADC and the pixel signal voltage Vx become identical, and the count processing performed in a period from the point when the reference signal SLP_ADC and the pixel signal voltage Vx become identical to a point when the processing reaches a maximum AD conversion period in that processing (usually, a point when the change in the reference signal SLP_ADC is stopped).

In this specification, the count processing performed in a period from a point when the reference signal SLP_ADC starts to change to a point when the reference signal SLP_ADC and the pixel signal voltage Vx become identical is also referred to as count processing of real numbers. On the other hand, the count processing performed in a period from the point when the reference signal SLP_ADC and the pixel signal voltage Vx become identical to a point when the processing reaches a maximum AD conversion period in that processing is also referred to as count processing of complements.

In general, two periods, one from a point when the reference signal SLP_ADC starts to change to a point when the reference signal SLP_ADC and the pixel signal voltage Vx become identical, and the other from a point when the reference signal SLP_ADC and the pixel signal voltage Vx become identical to a point when the processing reaches a maximum AD conversion period in that processing, correspond to an output level of the comparison pulses COMP outputted from the voltage comparing unit 252. Therefore, the comparison pulses COMP only has to be switched to start the count processing in a period of the L level or in a period of the H level.

In addition, in the second processing example, to make it possible to acquire a differential processing result as a result of the two periods of count processing, a first method is proposed that, when the count processing of the first period is started, a count value equivalent to a maximum AD conversion period in count processing performed after the point when the reference signal SLP_ADC and the pixel signal voltage Vx become identical is initially set as an initial value Dini with a sign (plus or minus) corresponding to a count mode affixed thereto. Then the count processing is started from the initial value Dini. A second method is also proposed that, while the count processing is started from "0" as in the first processing example, the initial value Dini is corrected at the post-stage of the counter units 254 after the count processing of the second period is completed. The first method is a method suitable when it is unnecessary to correct the initial value Dini at the post-stage of the counter units 254 and an AD conversion processing result for one pixel only has to be obtained. On the other hand, the second method is a method suitable when an AD conversion processing result of multiply-accumulation of the signal components Vsig of plural pixels is obtained.

In the example explained above, for the pixel signal voltage Vx for one pixel, the digital data Dsig of the signal component Vsig indicated by a differential result between the reset level Srst and the signal level Ssig is explained. It is also possible to acquire digital data of a subtraction processing result of arbitrary two kinds of processing object signals. In this case, the count processing of complements is applied to a subtrahend and the count processing of real numbers is applied to a minuend.

Principle

First Example

FIG. 3A is a diagram for explaining a first example of an operation principle of the column AD conversion processing in the second processing example. The first example is an example in which up-counters are used as the counter units 254. In the first example, during the AD conversion processing for the reset level Srst in the first period, which is an example of a processing object signal of a subtraction element, count processing is performed in the up-count mode in a period from a point when the reference signal SLP_ADC and the pixel signal voltage Vx (the reset level Srst) become identical to a point when the reference signal SLP_ADC reaches a predetermined end value, specifically, to a point when the processing reaches a maximum AD conversion period in that processing. During the AD conversion processing for the signal level Ssig in the second period, which is an example of an addition element, count processing is performed in the up-count mode in a period from a point when the reference signal SLP_ADC starts a change from the initial value SLP_ini to a point when the reference signal SLP_ADC and the pixel signal voltage Vx (the signal level Ssig) become identical.

In this case, as it is evident from the figure, a count number (represented as Drst_cnt) in the AD conversion processing for the reset level Srst in the first period is a value (=Drm−Drst) obtained by subtracting a count number Drst, which corresponds to the period from a point when the reference signal SLP_ADC starts to change to a point when the reference signal SLP_ADC and the pixel signal voltage Vx (the reset level Srst) become identical, from a maximum count number Drm, which corresponds to the maximum AD conversion period for the reset level Srst. Therefore, a count value D1 held in the counter units 254 after the AD conversion processing of the first period is represented by Equation (1-1).

If the initial value Dini of the count processing of the first period is set to a negative number of the maximum count number Drm corresponding to the maximum AD conversion period for the reset level Srst, the count value D1 held in the counter units 254 after the AD conversion processing for the reset level Srst in the first period is represented by Equation (1-2).

$$D1 = D\_ini + (Drm - Drst) \quad (1\text{-}1)$$

$$D1 = D\_ini + (Drm - Drst) = -Drst \quad (1\text{-}2)$$

It is seen that, during the processing in the P phase in the first period, when the reset level Vrst at the pixel signal voltage Vx is detected by the voltage comparing units 252 and the count operations are performed by the counter units 254, by setting the initial value Dini to the negative number of the maximum count number Drm, it is possible to read out the reset level Vrst of the unit pixels 3 to carry out the AD conversion for the reset level Vrst and hold digital data of the reset level Vrst as a negative number.

In the first processing example, the reset level Vrst of the unit pixels 3 is read out to carry out the AD conversion for the reset level Vrst and the digital data of the reset level Vrst is held as a negative number. Therefore, during the count processing of the first period, a mode different from a count mode during the count processing of the second period has to be set. However, if the mechanism of the operation principle of the first example in the second processing example is adopted, such switching of a count mode is unnecessary.

During the subsequent AD conversion processing for the signal level Ssig in the second period, count processing is started in the same up-count mode as in the AD conversion processing of the first period, from the count value D1 (=Dini+(Drm−Drst)=−Drst) held in the counter unit 254 after the AD conversion processing of the first period. A count value at the time when the reference signal SLP_ADC and the pixel signal voltage Vx (the signal level Ssig) become identical is held. As it is evident from the figure, a count number (represented as Dsig_cnt) in the AD conversion processing for the signal level Ssig in the second period is "Drst+Dsig" because the count value corresponds to a value obtained by combining the reset level Srst and the signal component Vsig.

Therefore, a count value D2 held in the counter unit 254 after the AD conversion processing of the second period is represented by Equation (2).

$$D2 = D\_ini + (Drm - Drst) + (Drst + Dsig) \quad (2)$$
$$= -Drst + (Drst + Dsig)$$
$$= Dsig$$

As it is evident from Equation (2), in a subtraction shown in the second row, subtraction processing is performed between the reset level Srst and the signal level Ssig. As it is seen from this, the signal level Ssig is a level obtained by adding the signal component Vsig to the reset level Srst. Therefore, a count number of an AD conversion result of the signal level Ssig is basically "Drst+Dsig". However, by setting a start point of the count processing of the second period to "−Drst" that is an AD conversion result of the reset level Srst, as in the first processing example, a count value actually held can be set to "−Drst+(Dsig+Drst)=Dsig". As in the first processing example, the CDS function and the AD conversion for the signal component Vsig can be simultaneously realized.

In the example explained above, the initial value Dini is a negative number of the maximum count number Drm. However, the initial value Dini may be "0" as in the first processing example. In this case, the count value D2 held in the counter units 254 after the count processing of the second period is represented by Equation (3), i.e., the maximum count number Drm is added to the digital value Dsig of the signal component Vsig.

$$D2 = D\_ini + (Drm - Drst) + (Drst + Dsig) \quad (3)$$
$$= Drm + Dsig$$

The maximum count number Drm is a constant and can be adjusted from the outside by the communication/timing control unit 20. A value of the maximum count number Drm can be arbitrarily determined according to the maximum AD conversion period for the reset level Srst. It is obvious to be understood from this that, the communication/timing control unit 20 has a correcting function that acquires digital data of a multiply-accumulation result of plural processing object signals, as the reference signal SLP_ADC in the count processing for the processing object signal of the subtraction element is corrected by a count value (in this example, Drm) corresponding to a period in which the reference signal SLP_ADC reaches a final value staring from the initial value Dini.

It is also possible to cope with the processing by providing the digital arithmetic unit 29 at the post-stage of the counter units 254 and performing a correction operation (in this example, subtraction). It is possible to easily acquire the digital value Dsig of the signal component Vsig. In this case, the digital arithmetic unit 29 has the function of the correcting unit. However, by setting the initial value Dini as the negative number of the maximum count number Drm, a value finally obtained in the two periods of count processing indicates a positive signal component Vsig. Therefore, if it is sufficient to only acquire the digital data Dsig of the signal component Vsig of one pixel, it is highly compatible to use an existing system.

Principle

Second Example

FIG. 3B is a diagram for explaining a second example of the operation principle of the column AD conversion processing in the second processing example. The second example is an example in which down-counters are used as the counter units 254. During the AD conversion processing for the reset level Srst in the first period, which is an example of the addition element, count processing is performed in the down-count mode in a period from a point when the reference signal SLP_ADC starts a change from the initial value SLP_ini to a point when the reference signal SLP_ADC and the pixel signal voltage Vx (the reset level Srst) become identical. During the AD conversion processing for the signal level Ssig in the second period, which is an example of the subtraction element, count processing is performed in the down-count mode in a period from a point when the reference signal SLP_ADC and the pixel signal voltage Vx (the signal level Ssig) become identical to a point when the reference signal SLP_ADC reaches a predetermined end value, specifically, to a point when the processing reaches a maximum AD conversion period in that processing.

In this case, the count number Drst_cnt in the AD conversion processing for the reset level Srst in the first period is the digital value Drst of the reset level Srst. Therefore, taking into account the down-count mode, the count value D1 held in the counter units 254 after the AD conversion processing of the first period is represented by Equation (4).

$$D1 = D\_ini - Drst \quad (4)$$

During the AD conversion processing for the signal level Ssig in the second period after this, from a point when the reference signal SLP_ADC and the pixel signal voltage Vx (the signal level Ssig) become identical, count processing is started from the count number "Dini-Drst" held in the counter units 254 after the AD conversion processing of the first period in the down-count mode as in the AD conversion processing of the first period. When the processing reaches a maximum AD conversion period in that processing, the count processing is stopped and a count value at that point is held in the counter units 254.

As it is evident from the figure, the count number Dsig_cnt in the AD conversion processing for the signal level Ssig in the second period is a value (=Dsm−(Drst+Dsig)) obtained by subtracting the count number "Drst+Dsig", which corresponds to a period from a point when the reference signal SLP_ADC starts to change to a point when the reference signal SLP_ADC and the pixel signal voltage Vx (the signal level Ssig) become identical, from the maximum count number Dsm, which corresponds to a maximum AD conversion period for the signal level Ssig. Therefore, taking into account the down-count mode, the count value D2 held in the counter units 254 after the AD conversion processing of the second period is represented by Equation (5-1).

$$D2 = D\_ini - Drst - (Dsm - (Drst + Dsig)) \quad (5-1)$$
$$= (D\_ini - Drm) - Drst + (Drst + Dsig)$$
$$= D\_ini - Dsm + Dsig$$

$$D2 = D\_ini - Dsm + Dsig \quad (5-2)$$
$$= Dsig$$

In the case of this example, the reset level Srst in the first period is an example of the addition element. However, subtraction processing is substantially performed by a combination with the down-count mode for performing counting in the negative direction. As indicated in the first row of Equation (5-1), practically, the reset level Srst can be converted into a subtraction element.

In the case of this example, the signal level Ssig in the second period is an example of the subtraction element. However, subtraction processing is substantially performed by a combination with the down-count mode for performing counting in the negative direction. As it is estimated from the first row of Equation (5-1), practically, after the AD conversion, the signal level Ssig can be converted into an addition element by a combination of the subtraction element and the subtraction processing.

As it is evident from Equation (5-1), a subtraction shown in the second row includes a component identical with the subtraction shown in the second row of Equation (2). Therefore, subtraction processing is performed between the reset level Srst and the signal level Ssig. As a difference from Equation (2), a component "Dini−Dsm" is present. However, Dsig corresponding to the signal component Vsig can be acquired by two periods of count processing in the up-count mode for the reset level Srst and the signal level Ssig.

If the initial value Dini of the count processing of the first period is set to the maximum count number Dsm corresponding to the maximum AD conversion period for the signal level Ssig, the count value D2 held in the counter units 254 after the AD conversion processing for the signal level Ssig in the second period is represented by Equation (5-2). As in the first processing example and the operation principle of the first example, a count value actually held can be set to "Dsig". As in the first processing example and the operation principle of the first example, the CDS function and the AD conversion for the signal component Vsig can be simultaneously realized. Even when the mechanism of the operation principle of the second example is adopted, the switching of count modes in the first processing example is unnecessary.

The up-count mode or the down-count mode is set according to whether the count processing of complements is processing of the first period or processing of the second period. While the initial value Dini is set to a value corresponding to the maximum count number Dsm in performing the count processing of complements, the initial value Dini is set to a positive number or a negative number according to a count mode. Therefore, there is no large difference in a basic mechanism between the operation principles of the first example and that of the second example.

In the example explained above, the initial value Dini is the maximum count number Dsm. However, the initial value Dini may be "0" as in the first processing example. In this case, a count value held in the counter units 254 after the count processing of the second period is (Dini−Dsm+Dsig=−Dsm+Dsig". The maximum count number Dsm is subtracted from the digital value Dsig of the signal component Vsig. The maximum count number Dsm is a constant and can be adjusted from the outside by the communication/timing control unit 20. A value of the maximum count number Dsm can be arbitrarily determined according to the maximum AD conversion period for the signal level Ssig.

Therefore, for example, it is also possible to cope with the processing by providing the digital arithmetic unit 29 at the post-stage of the counter units 254 and performing a correction operation (in this example, addition). It is possible to easily acquire the digital value Dsig of the signal component Vsig. In this case, the digital arithmetic unit 29 has the function of the correcting unit. However, by giving the function of the correcting unit to the communication/timing control unit and setting the initial value Dini as the maximum count number Dsm, a value finally obtained in the two periods of count processing indicates the positive signal component Vsig. Therefore, if it is sufficient to only acquire the digital data Dsig of the signal component Vsig of one pixel, it is highly compatible to use an existing system.

AD Conversion Processing Operation

Operations in the Third Processing Example

Although not shown in the figure, in the case of the third processing example, only one of the down-count operation and the up-count operation is performed. In both the two periods of processing, the start of counting is set at a point when the reference signal SLP_ADC starts to change and the end of the counting is set at a point when the reference signal SLP_ADC and a processing object signal voltage coincide with each other, or the start of counting is set at the point when the reference signal SLP_ADC and the processing object signal voltage coincide with each other, and the end of the counting is set at a point when the counting reaches a desired count number in that counting (typically, a point when the processing reaches a maximum AD conversion period).

The column AD circuits 250 output count results in the respective times of counting to the digital arithmetic unit 29 as AD conversion data Drst_cnt concerning the reset level Srst and AD conversion data Dsig_cnt concerning the signal level Ssig. The digital arithmetic unit 29 performs differential processing using the AD conversion data Drst_cnt and Dsig_cnt to acquire AD conversion data Dsig concerning the signal component Vsig.

<Configuration Example of a Reference-Signal Generating Unit for the Reference Signal SLP_SUN>

Figure 4A:
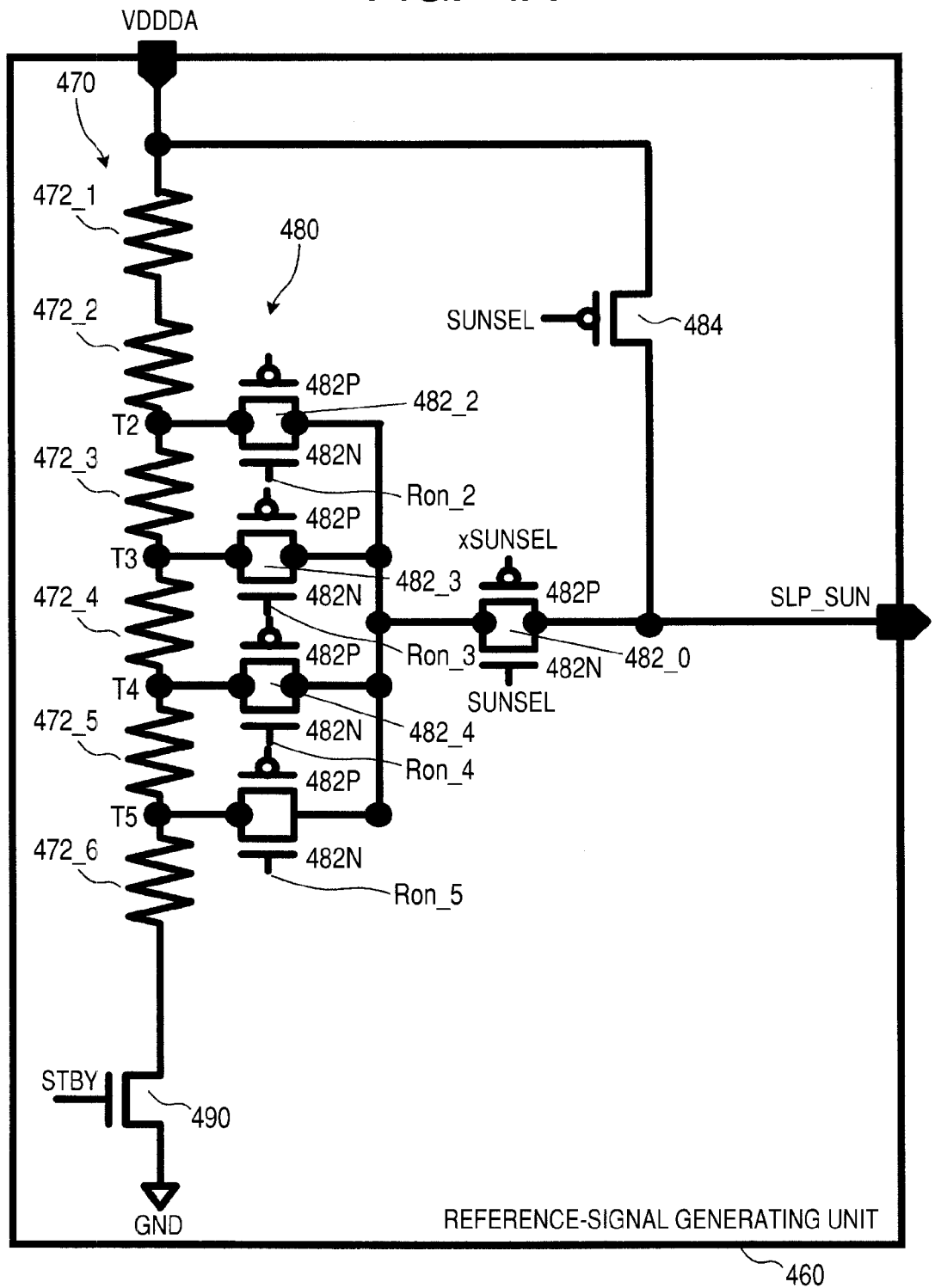
FIG. 4A is a diagram showing a configuration example of a reference-signal generating unit that generates a reference signal for blackening phenomenon detection.

FIGS. 4A and 4B are diagrams for explaining the reference-signal generating unit 460 that generates the reference signal SLP_SUN supplied to the blackening detecting units 400 in the respective vertical columns. FIG. 4A is a diagram showing a configuration example of the reference-signal generating unit 460 that generates the reference signal SLP_SUN supplied to the blackening detecting units 400 in the respective vertical columns. FIG. 4B is a diagram showing an example of the reference signal SLP_SUN generated by the reference-signal generating unit 460 and outputted from an output terminal 460_out.

The reference-signal generating unit 460 according to this embodiment generates, as the reference-signal SLP_SUN for determining in the blackening detecting units 400 whether the large light-amount imaging condition is satisfied, a reference signal having an initial value and the determination level in time series, specifically, a reference signal that is at an initial value level in the beginning and can reach the determination level after the elapse of a predetermined time.

As shown in FIG. 4A, the reference-signal generating unit 460 includes a resistor circuit 470 in which plural resistive elements 472_k are connected in series, a switch unit 480 that transmits a voltage level at a certain stage of the resistor circuit 470 to a post-stage, and an NMOS transistor 490 that functions as a switch for supplying an operation current to the resistor circuit 470.

One end of the resistor circuit 470 is connected to a power supply VDDDA. A source terminal of the NMOS transistor 490 is grounded, a drain terminal as an output terminal 490 is connected to the other end of the resistor circuit 470, and a control signal STBY is supplied to a gate terminal thereof. The control signal STBY is set to active H in order to stop the operation current (a DC current) of the resistor circuit 470 during standby.

In the resistor circuit 470, in the example shown in the figure, six resistive elements 472_1 to 472_6 are cascaded between the power supply VDDDA and an output side (a drain side) of the NMOS transistor 490. The switch unit 480 having an analog switch of a transfer gate configuration is provided in order to transmit voltage levels (also referred to as tap voltages) between a second stage and a third stage (referred to as tap T2), between the third stage and a fourth stage (referred to as tap T3), between the fourth stage and a fifth stage (referred to as tap T4), and between the fifth stage and a sixth stage (referred to as tap T6) from the power supply VDDDA side to the post-stage.

Specifically, the reference-signal generating unit 460 includes, for each of the taps T2, T3, T4, and T5, an analog switch 482 of a transfer gate configuration in which source terminals and drain terminals of two CMOS SW transistors 482P and 482N with different polarities of a CMOS configuration formed by the complementary circuit technique are connected, respectively.

The reference-signal generating unit 460 also includes, common to respective analog switches 482_2 to 482_5 of the respective taps T2, T3, T4, and T5, an analog switch (also including two CMOS SW transistors 482P and 482N) of the transfer gate configuration.

Moreover, the reference-signal generating unit 460 includes a PMOS transistor 484 as a switch for initializing (in this example, to a power supply potential) the reference signal SLP_SUN outputted from the output terminal 460_out of the reference-signal generating unit 460. The output terminal 460_out of the reference-signal generating unit 460 is connected in common to an output terminal (a drain terminal side) of the analog switch 482_0 and a drain terminal side of the PMOS transistor 484.

Input terminals (source terminal sides) of the SW transistor 482P and 482N of the analog switches 482 are connected to the taps T2, T3, T4, and T5 side corresponding thereto of the resistor circuit 470. Output terminals (drain terminal sides) of the respective SW transistors 482P and 482N are connected to an input terminal (a source terminal side) of the analog switch 482_0 in common for all the taps.

Control signals Ron_2 to Ron_5 having a complementary relation of H active and L active are supplied to gate terminals of the SW transistors 482N_2 to 482N_5 and gate terminals of the SW transistors 482P_2 to 482P_5, respectively. Consequently, the complementarily-connected SW transistors 482N_2 to 482N_5 and the SW transistors 482P_2 to 482P_5 are simultaneously turned on or turned off. In this example, the control signals Ron_2 to Ron_5 turn on the analog switches 482_2 to 482_5 from the tap T2 on the power supply VDDDA side to the subsequent taps T3, T4, and T5. Alternatively, the control signals Ron_2 to Ron_5 turn on any one of the analog switches 482_2 to 482_5 having a tap potential of any one of the taps.

As the analog switches, in principle, switches formed by n-channel MOS transistors or p-channel MOS transistors of any one of the SW transistors 482P and 482N may be adopted. However, in this case, since there is a problem of a threshold voltage, CMOS switches including a combination of both the n-channel and p-channel MOS transistors is adopted.

A source terminal of the PMOS transistor 484 is connected to the power supply VDDDA and a control signal SUNSEL of active H is supplied to a gate terminal thereof. In the analog switch 482_0, the control signal SUNSEL is supplied to a gate terminal of the SW transistor 482N and a control signal xSUNSEL obtained by logically inverting the control signal SUNSEL is supplied to a gate terminal of the SW transistor 482P.

When the control signal SUNSEL is inactive L (low), the PMOS transistor 484 is turned on and (the respective SW transistors 482N and 482P of) the analog switch 482_0 is turned off, whereby the reference signal SLP_SUN is initialized to the power supply potential. When the control signal SUNSEL is active H (high), the PMOS transistor 484 is turned off and (the respective SW transistors 482N and 482P of) the analog switch 482_0 is turned on, whereby the reference signal SLP_SUN, which has a transitional response, generated by the resistor circuit 470 and the switch unit 480 is outputted from the output terminal 460_out.

In FIG. 4B, an example of the reference signal SLP_SUN generated by the reference-signal generating unit 460 and outputted from the output terminal 460_out is shown together with the control signal SUNSEL and the control signals Ron_2 to Ron_5. As shown in FIG. 4A, the reference-signal generating unit 460 simply includes the combination of the resistive taps and can generates the reference signal SLP_SUN in which an initial value V_ini and a determination level V_det of blackening phenomenon appear in time series according to switching of the analog switches 482.

For example, when the resistive taps are not selected, since the control signal SUNSEL becomes inactive L, the analog switch 482_0 is turned off and an output portion of a resistance divider voltage comes into a high impedance (Hi-Z) state. At this point, the PMOS transistor 484 is turned on to directly raise a potential at the output terminal 460_out to a power supply VDDDA level. The power supply VDDDA level is the initial value V_ini.

On the other hand, it is possible to set the determination level V_det for determining presence of a blackening phenomenon according to switching of the resistive taps T2, T3, T4, and T5. For example, in FIG. 4B (1), the analog switches 482_2 to 482_5 are turned on from the tap T2 on the power supply VDDDA side to the subsequent taps T3, T4, and T5. In this case, a potential of the tap T5 at the time when the analog switch 482_5 is turned on is a potential (a final value) of the determination level V_det. Basically, the potential changes in a stepwise manner. However, since various load capacities are connected to the resistor circuit 470, the potential gently changes from the initial value V_ini to the determination level V_det according to an integration effect between the potential and the load capacities.

On the other hand, in FIG. 4B (2), the analog switches 482_2 to 482_5 having a tap potential of any one of the taps is turned on. In this case, a potential of the tap reaches a tap potential corresponding thereto (equivalent to the determination level V_det) more smoothly than the change shown in FIG. 4B (1).

<<Relation Among the Voltage Comparing Unit, the Blackening Detecting Unit, and the Data-Storage Control Unit>>

Figure 5:
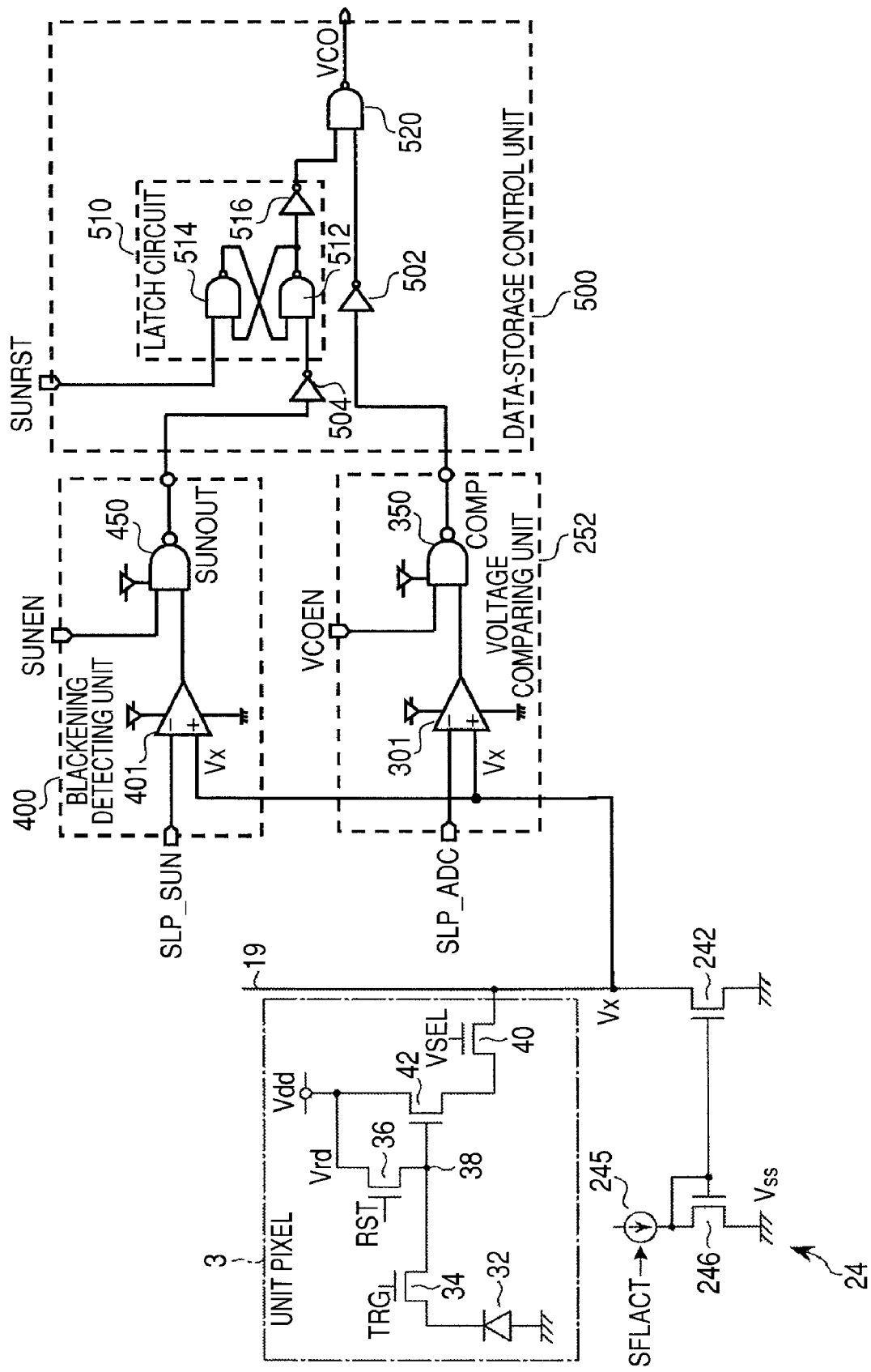
FIG. 5 is a diagram for explaining a relation among a voltage comparing unit for AD conversion, a blackening detecting unit, and a data-storage control unit.

FIG. 5 is a diagram for explaining a relation among the voltage comparing unit 252 for AD conversion, the blackening detecting unit 400, and the data-storage control unit 500. Configurations of the unit pixel (a pixel cell) 3 in the pixel array unit 10 and the readout-current controlling unit 24 are also shown. The count-phase switching unit 260 is provided at the post-stage of the data-storage control unit 500.

<Overview>

The pixel signal voltage Vx outputted from the unit pixel 3 as a processing object signal is supplied in common to the voltage comparing unit 252 and the blackening detecting unit

400. The voltage comparing unit 252 and the blackening detecting unit 400 have generally the same circuit configuration.

The voltage comparing unit 252 as a second comparing unit includes a comparing unit (COMP) 301 that compares the reference signal SLP_ADC for AD conversion generated by the DA conversion circuit 27a of the reference-signal generating unit 27 and the pixel signal voltage Vx and a buffer unit 350 having an amplifier function that converts a comparison result of the comparing unit 301 into information of a logical level.

The reference signal SLP_ADC for AD conversion generated by the DA conversion circuit 27a of the reference-signal generating unit 27 is supplied to one input terminal of the comparing unit 301. The pixel signal voltage Vx from the vertical signal line 19 is supplied to the other input terminal thereof.

The buffer unit 350 includes an NAND gate as a basic element. A comparison output of the comparing unit 301 is supplied to one input terminal of the buffer unit 350. A control signal VCOEN of active H for controlling whether the comparison output COMP of the voltage comparing unit 252 should be activated is supplied to the other input terminal thereof.

The blackening detecting unit 400 includes a comparing unit (COMP) 401 that compares the reference signal SLP_SUN for blackening phenomenon determination generated by the reference-signal generating unit 460 and the pixel signal voltage Vx and a buffer unit 450 having an amplifier function that converts a comparison result of the comparing unit 401 into information of a logical level.

The reference signal SLP_SUN for blackening phenomenon determination generated by the reference-signal generating unit 460 is supplied to one input terminal of the comparing unit 401. The pixel signal voltage Vx from the vertical signal line 19 is supplied to the other input terminal thereof.

The buffer unit 450 includes an NAND gate as a basic element. A comparison output of the comparing unit 401 is supplied to one input terminal of the buffer unit 450. A control signal SUNEN of active H for controlling whether a determination output SUNOUT of the blackening detecting unit 400 should be activated is supplied to the other input terminal thereof. An output of the blackening detecting unit 400 changes to the L level when the comparing unit 401 detects a blackening phenomenon. When the control signal SUNEN is at the H level, information on this change is logically inverted and outputted from the buffer unit 450. In other words, the blackening detection information SUNOUT as an output of the buffer unit 450 is at the L level when a blackening phenomenon is not detected. The blackening detection information SUNOUT changes to the H level when a blackening phenomenon is detected.

The data-storage control unit 500 transmits, on the basis of the comparison pulse COMP from the voltage comparing unit 252 and the blackening determination signal SUNOUT from the blackening detecting unit 400, a control signal VCO for controlling an operation for holding a count value of the counter unit 254 to the post-stage circuit instead of the comparison pulse COMP.

Therefore, the data-storage control unit 500 includes an inverter 502 that logically inverts the comparison pulse COMP from the voltage comparing unit 252, an inverter 504 that logically inverts the blackening determination signal SUNOUT from the blackening detecting unit 400, a latch circuit 510, and an NAND gate 520 of a two-input type that functions as an output buffer.

The latch circuit 510 includes two NAND gates 512 and 514 of a two-input type, inputs and outputs of which are diagonally connected, and an inverter 516 that logically inverts an output of the NAND gate 512. An output of the inverter 504 (i.e., an output obtained by logically inverting the blackening determination signal SUNOUT from the blackening detecting unit 400) is supplied to one input terminal of the NAND gate 512. An output of the NAND gate 514 is supplied to the other input terminal thereof. A reset signal SUNRST is supplied to one input terminal of the NAND gate 514 while an output of the NAND gate 512 is supplied to the other input terminal thereof. An output of the inverter 502 (i.e., an output obtained by logically inverting the comparison pulse COMP from the voltage comparing unit 252) is supplied to one input terminal of the NAND gate 520 while an output of the inverter 516 is supplied to the other input terminal thereof. The NAND gate 520 outputs the control signal VCO replacing the comparison pulse COMP.

<Configuration Examples of the Unit Pixel and the Readout-Current Controlling Unit>

A configuration of the unit pixel 3 in the pixel array unit 10 is the same as that of a normal CMOS image sensor. An intra-pixel amplifier of the unit pixel 3 only has to be an intra-pixel amplifier that can output a signal charge generated and accumulated by the charge generating unit of the unit pixel 3 as an electric signal. Various configurations can be adopted. In general, an intra-pixel amplifier of an FDA (Floating Diffusion Amplifier) configuration is used.

As an example of the unit pixel 3, it is possible to use a unit pixel including four transistors generally used as a CMOS sensor. The unit pixel includes, with respect to the charge generating unit, a transfer unit including a transistor for readout and selection as an example of a charge readout unit (a transfer gate unit/a readout gate unit), an initializing unit including a reset transistor as an example of a reset gate unit, a transistor for vertical selection, and a transistor for amplification of a source follower configuration as an example of a detection element for detecting a potential change in a floating diffusion portion (also referred to as floating node).

Alternatively, it is also possible to use a unit pixel including three transistors. The unit pixel includes a transistor for amplification connected to a drain line (DRN) for amplifying a signal voltage corresponding to a signal charge generated by the charge generating unit, a reset transistor for resetting the charge generating unit, and a transistor for readout and selection (a transfer gate unit) scanned by a vertical shift resistor through a transfer wiring (TRF).

It goes without saying that these pixel configurations are examples. Any unit pixel can be used as long as the unit pixel has an array configuration of a normal CMOS image sensor.

For example, the unit pixel 3 having the 4-TR (four-transistor) configuration shown in FIG. 5 includes a charge generating unit 32 that has, together with a photoelectric conversion function for receiving light and converting the light into an electric charge, functions such as a charge accumulating function for accumulating the electric charges, a transistor for readout and selection (a transfer transistor) 34 as an example of a charge readout unit (a transfer gate unit/a readout gate unit), a reset transistor 36 that is an example of a reset gate unit, a transistor for vertical selection 40, and a transistor for amplification 42 of a source follower configuration as an example of a detection element for detecting a voltage change in a floating diffusion portion 38.

The transistor for readout and selection 34 forming the transfer unit is driven through a transfer wiring (a readout and selection line TX) 55 by a transfer driving buffer (not shown) to which the transfer signal φTRG is supplied. The reset transistor 36 forming the initializing unit is driven through a reset wiring (RST) 56 by a reset driving buffer (not shown) to which a reset signal φRST is supplied. The transistor for vertical selection 40 is driven through a vertical selection line (SEL) 52 by a selection driving buffer (not shown) to which the vertical selection signal φVSEL is supplied. The respective driving buffers can be driven by the vertical driving unit 14*b* of the vertical scanning unit 14.

In the charge generating unit 32 as an example of the detecting unit including a light-receiving element DET such as a photodiode PD, one terminal (an anode side) of the light-receiving element DET is connected to a reference potential Vss (a negative potential: e.g., about −1V). The other terminal (a cathode side) thereof is connected to an input terminal (typically, a source) of the transistor for readout and selection 34. The reference potential Vss may be a ground potential GND.

An output terminal (typically, a drain) of the transistor for readout and selection 34 is connected to a connection node to which the reset transistor 36, the floating diffusion portion 38, and the transistor for amplification 42 are connected. The transfer pulse TRG is supplied to a control input terminal (a gate) thereof from the transfer driving buffer.

A source of the reset transistor 36 in the pixel-signal generating unit 5 is connected to the floating diffusion portion 38 and a drain thereof is connected to a power supply Vrd (usually, as shown in the figure, commonly used with the power supply Vdd). The pixel reset pulse RST is inputted to a gate (a reset gate RG) thereof from the reset driving buffer.

As an example, a drain of the transistor for vertical selection 40 is connected to a source of the transistor for amplification 42, a source thereof is connected to a pixel line 51, and a gate (specifically referred to as vertical selection gate SELV) thereof is connected to a vertical selection line 52. The transistor for vertical selection 40 is not limited to such connection structure. The arrangement of the transistor for vertical selection 40 and the transistor for amplification 42 may be reversed to connect the drain of the transistor for vertical selection 40 to the power supply Vdd, connect the source thereof to a drain of the transistor for amplification 42, and connect the source of the transistor for amplification 42 to the pixel line 51. The vertical selection signal φVSEL is applied to the vertical selection line 52.

A gate of the transistor for amplification 42 is connected to the floating diffusion portion 38, the drain thereof is connected to the power supply Vdd, and the source thereof is connected to the pixel line 51 via the transistor for vertical selection 40 and further connected to the vertical signal line 19.

One end of the vertical signal line 19 extends to the column processing unit 26 side. In a path of the vertical signal line 19, the readout-current source unit 24 is connected to the vertical signal line 19. A source follower configuration in which a substantially fixed operation current (readout current) is supplied between the readout current source unit 24 and the transistor for amplification 42 is adopted.

Specifically, the readout-current source unit 24 includes an NMOS transistor (specifically referred to as load MOS transistor) 242 provided in each of the vertical columns and a reference-current source unit 244 including a current generating unit 245 commonly used for all the vertical columns and an NMOS transistor 246, a gate and a drain of which are connected in common and a source of which is connected to a source line 248.

A drain of the load MOS transistor 242 is connected to the vertical signal line 19 in a column corresponding thereto. A source thereof is also connected to the source line 248, which is a ground line. Consequently, the source of the load MOS transistor 242 in the vertical column and the source of the transistor 246 of the reference-current source unit 244 are connected to form a current mirror circuit. The load MOS transistor 242 is connected to the vertical signal line 19 to function as a current source.

A load control signal SFLACT for outputting a predetermined current only when necessary is supplied to the current generating unit 245 from a not-shown load control unit. An active state of the load control signal SFLACT is inputted to the current generating unit 245 when a signal is read out. Therefore, the current generating unit 245 continues to feed a constant current determined in advance using the load MOS transistor 242 connected to the transistor for amplification 42. In other words, the load MOS transistor 242 forms a source follower with the transistor for amplification 42 in a selected row and supplies a readout current to the transistor for amplification 42 to thereby cause the transistor for amplification 42 to output a signal to the vertical signal line 19.

In such a 4TR configuration, the floating diffusion portion 38 is connected to the gate of the transistor for amplification 42. Therefore, the transistor for amplification 42 outputs a signal corresponding to a potential of the floating diffusion portion 38 (hereinafter referred to as FD potential) to the vertical signal line 19 (53) through the pixel line 51 in a voltage mode.

<Configuration of the Voltage Comparing Unit>

Figure 6A:
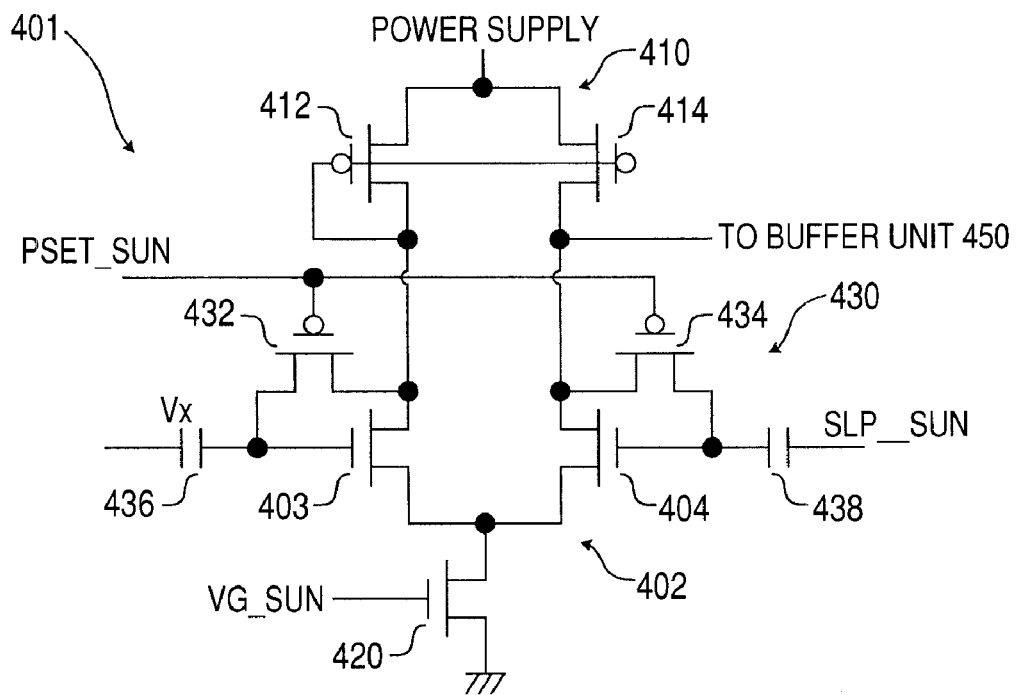
FIG. 6A is a schematic circuit diagram showing a configuration example of a comparing unit of the blackening detecting unit.

FIG. 6A is a schematic circuit diagram showing a configuration example of the comparing unit 401 of the blackening detecting unit 400. The comparing unit 401 has a characteristic that it is possible to determine, by contriving a circuit configuration, whether a large light-amount imaging condition is satisfied without being affected by fluctuation in a reset component ΔV for each of the unit pixels 3.

As a basic configuration of the comparing unit 401, a generally well-known differential amplifier configuration is adopted. The comparing unit 401 includes a differential transistor pair unit 402 including NMOS transistors 403 and 404, a load transistor pair unit 410, which is arranged on a power supply side, including PMOS transistors 412 and 414 as output loads of the differential transistor pair unit 402, and a current source unit 420 including an NMOS constant current source transistor 422 arranged on a ground (GND) side that supplies a constant operation current to the respective units 402 and 410.

Respective sources of the transistors 403 and 404 are connected in common to a drain of the constant current source transistor 422. Drains of the transistors 412 and 414 of the load transistor pair unit 410 corresponding to respective drains (output terminals) of the transistors 403 and 404 are connected thereto. A DC gate voltage VG_SUN is inputted to a gate of the constant current source transistor 422.

An output of the differential transistor pair unit 402 (in the example shown in the figure, the drain of the transistor 404) is connected to the not-shown buffer unit 450 having the amplifier function. After being sufficiently amplified, the output is outputted as the blackening detection information SUNOUT.

The comparing unit 401 also includes an operating-point resetting unit 430 that resets an operating point of the comparing unit 401. The operating-point resetting unit 430 includes PMOS switch transistors 432 and 434 and capacitive elements 436 and 438 for signal coupling.

The switch transistor 432 is connected between a gate (an input terminal) and the drain (the output terminal) of the transistor 403. The switch transistor 434 is connected between a gate (an input terminal) and the drain (the output terminal) of the transistor 404. A comparator reset signal PSET_SUN is supplied in common to the respective gates.

The timing when the comparator reset signal PSET_SUN is activated is set, for example, in a period when the reset signal RST supplied to a gate terminal of the reset transistor 36 of the unit pixel 3 is active, and furthermore, when the reference signal SLP_SUN is at the initial value V_ini. Alternatively, the timing may be in a period when the pixel signal voltage Vx becomes the reset level Srst after the reset signal RST supplied to the gate terminal of the reset transistor 36 of the unit pixel 3 changes from active to inactive, and furthermore, when the reference signal SLP_SUN is at the initial value V_ini.

The pixel signal Vx is supplied to the gate (the input terminal) of the transistor 403 via the capacitive element 436. The reference signal SLP_SUN from the not-shown reference-signal generating unit 460 is supplied to the gate (the input terminal) of the transistor 404.

In such a configuration, the operating-point resetting unit 430 shows a sample/hold function with respect to signals inputted via the capacitive elements 436 and 438. The operating-point resetting unit 430 activates (in this example, to the L level) the comparator reset signal PSET_SUN only immediately before the comparison of the pixel signal Vx and the reference signal SLP_SUN (more specifically, the determination level V_det of a blackening phenomenon). The operating-point resetting unit 430 resets an operating point of the differential transistor pair unit 402 to a drain voltage (a readout potential; an operation reference value for reading out a reference component and a signal component). Thereafter, the operating-point resetting unit 430 inputs the pixel signal Vx to the transistor 403 via the capacitive element 436 and inputs the reference signal SLP_SUN (more specifically, the determination level V_det) to the transistor 403 via the capacitive element 438. The operating-point resetting unit 430 compares the pixel signal Vx and the reference signal SLP_SUN (more specifically, the determination level V_det) until the signals have the same potential.

In the beginning of the comparison processing, the determination level V_det of the reference signal SLP_SUN is lower than the pixel signal Vx and an output of the comparing unit 401 is at the H level. Thereafter, when the pixel signal Vx and the determination level V_det of the reference signal SLP_SUN have the same potential, the output of the comparing unit 401 is inverted from the H level to the L level. The L level is supplied to one input terminal of the not-shown buffer unit 450 basically having the NAND configuration. If the control signal SUNEN supplied to the other input terminal of the buffer unit 450 is active H, the buffer unit 450 logically inverts the L level to the H level. Consequently, the blackening detecting unit 400 changes the blackening detection information SUNOUT from the L level to the H level when the pixel signal voltage Vx and the determination level V_det coincide with each other. In other words, the blackening detecting unit 400 sets the blackening detection information SUNOUT to the H level when a blackening phenomenon is detected.

When (an active state of) the reset signal RST is supplied to the gate terminal of the reset transistor 36 of the unit pixel 3 to reset the unit pixel 3 (referred to as pixel reset), a noise pulse of a relatively large voltage level occurs in the pixel signal voltage Vx on the vertical signal line 19 in a period in which the reset signal RST is in an active state. Thereafter, when the reset signal RST changes from active to inactive, the pixel signal voltage Vx settles at the reset level Srst. A level of the noise pulse at the time of reset active and the reset level Srst after that time fluctuate for each of the unit pixels 3. The signal level Ssig corresponding to a signal charge detected by the charge generating unit 32 is superimposed on the reset level Srst and the pixel signal voltage Vx appears as the signal level Ssig. Therefore, when the reset level Srst fluctuates, the signal level Ssig also fluctuates. In this case, the fluctuation does not affect the signal level Ssig itself. In the CDS processing, taking this point into account, the signal level Ssig without the influence of the fluctuation is acquired by calculating a difference between the reset level Srst and the signal level Ssig.

The fluctuation in the pixel signal voltage Vx due to the pixel reset operation also occurs during the determination of a blackening phenomenon. If the determination is not performed by taking into account the fluctuation for each of the unit pixels 3 of the reset level Srst and the signal level Ssig in the pixel signal voltage Vx, it is difficult to perform proper determination concerning the respective unit pixels 3.

Therefore, in this embodiment, in a period in which the reference signal SLP_SUN is at the initial value V_ini (when the reset transistor 36 is reset or when the pixel signal voltage Vx is at the reset level Srst), the comparator reset signal PSET_SUN is activated to temporarily connect (short-circuit) the gates and the drains of the transistors 403 and 404 of the differential transistor pair unit 402 and form a diode connection.

The reference signal SLP_SUN having the initial value level V_ini and the determination level V_det in time series and the pixel signal voltage Vx from the unit pixel 3 are inputted to the comparing unit 401 in capacitive coupling. By performing an initialization operation for short-circuiting an input and an output of the comparing unit 401 when the reference signal SLP_SUN is at the initial value level V_ini and setting the initial value level V_ini and the pixel signal voltage Vx during pixel reset period to the same level, the determination level V_det is prevented from being affected by the fluctuation in the pixel signal voltage due to the pixel reset.

Thereafter, the input from the transistor for amplification 42 of the unit pixel 3 added with an offset component of the transistor 404 is held at the input terminal (the gate) of the transistor 404. Then, the reference signal SLP_SUN (more specifically, the determination level V_det) is inputted and comparison of the pixel signal Vx and the reference signal SLP_SUN (more specifically, the determination level V_det) is started. In this way, an operating point of the comparing unit 401 is set at a readout potential of the pixel signal for each of the unit pixels 3. Therefore, when presence or absence of a blackening phenomenon is determined, the influence of the fluctuation in the reset level Srst is reduced.

Figure 6B:
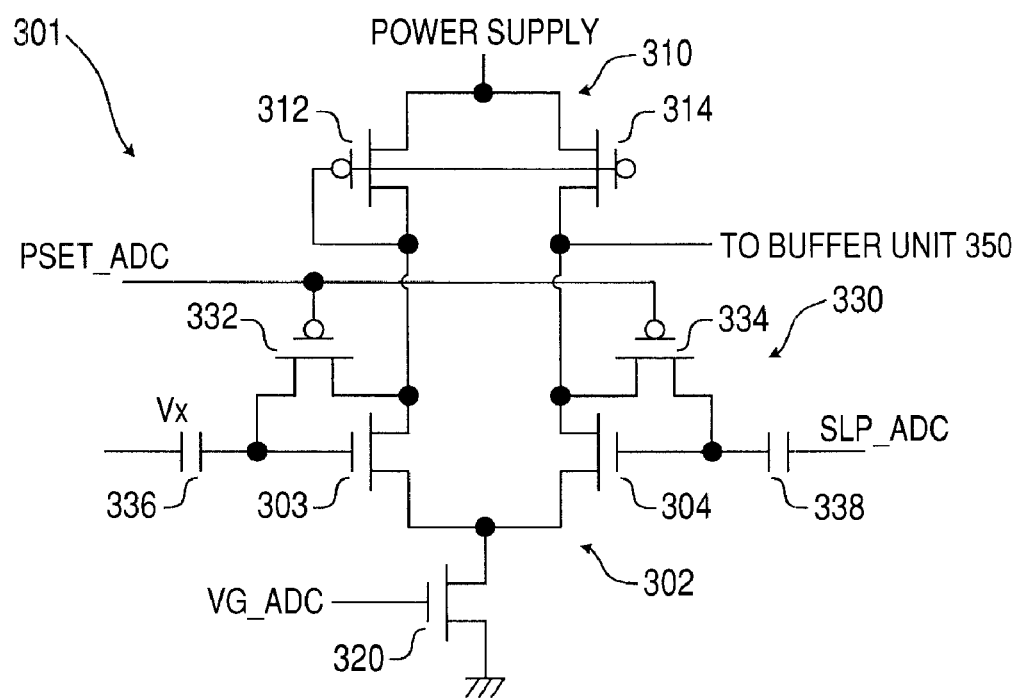
FIG. 6B is a schematic circuit diagram showing a configuration example of a comparing unit of the voltage comparing unit for AD conversion.

FIG. 6B is a schematic circuit diagram showing a configuration example of the comparing unit 301 of the voltage comparing unit 252. The comparing unit 301 has a characteristic that it is possible to set, by contriving a circuit configuration, a comparison period without being affected by fluctuation in the reset component ΔV.

A basic configuration of the comparing unit 301 is the same as that of the comparing unit 401 of the blackening detecting unit 400. Components of the comparing unit 301 corresponding to those of the comparing unit 401 are denoted by numbers beginning with 3 instead of the numbers beginning with 4. Differences from the comparing unit 401 are mainly explained.

A DC gate voltage VG_ADC is inputted to the gate of the constant current source transistor 322. An output of a differential transistor pair unit 302 (in the example shown in the figure, a drain of a transistor 304) is connected to the not-shown buffer unit 350 having the amplifier function. After being sufficiently amplified, the output is outputted as the comparison pulse COMP.

A comparator reset signal PSET_ADC is supplied in common to respective gates of switch transistors 332 and 334 of an operating-point resetting unit 330.

The timing when the comparator reset signal PSET_ADC is activated is set in a period when the pixel signal voltage Vx becomes the reset level Srst after the reset signal RST supplied to the gate terminal of the reset transistor 36 of the unit pixel 3 changes from active to inactive. Alternatively, the timing is in a period when the reset signal RST supplied to the gate terminal of the reset transistor 36 of the unit pixel 3 is active. In these periods, the reference signal SLP_ADC is at a reset level slightly lower than an initial value that is a start level of a change to a ramp shape.

The pixel signal Vx is supplied to a gate (an input terminal) of a transistor 303 via a capacitive element 336. The reference signal SLP_ADC is supplied to a gate (an input terminal) of the transistor 304 from the not-shown reference-signal generating unit 27.

In such a configuration, the operating-point resetting unit 330 shows a sample/hold function with respect to signals inputted via capacitive elements 336 and 338. The operating-point resetting unit 330 activates (in this example, to the L level) the comparator reset signal PSET_ADC only immediately before the comparison of the pixel signal Vx and the reference signal SLP_ADC. The operating-point resetting unit 330 resets an operating point of the differential transistor pair unit 302 to a drain voltage (a readout potential; an operation reference value for reading out a reference component and a signal component). Thereafter, the operating-point resetting unit 330 inputs the pixel signal Vx to the transistor 303 via the capacitive element 336 and inputs (a changing period of) the reference signal SLP_ADC to the transistor 303 via the capacitive element 338. The operating-point resetting unit 330 compares the pixel signal Vx and the reference signal SLP_ADC until the signals have the same potential. When the pixel signal Vx and the reference signal SLP_ADC have the same potential, an output of the comparing unit 301 is inverted.

In the beginning of the comparison processing, the reference signal SLP_ADC is higher than the pixel signal Vx and an output of the comparing unit 301 is at the L level. Thereafter, when the pixel signal Vx and the reference signal SLP_ADC have the same potential, the output of the comparing unit 301 is inverted from the L level to the H level. The H level is supplied to one input terminal of the not-shown buffer unit 350 basically having the NAND configuration. If the control signal VCOEN supplied to the other input terminal of the buffer unit 350 is active H, the buffer unit 350 logically inverts the H level to the L level. Consequently, the voltage comparing unit 252 changes the comparison pulse COMP from the H level to the L level when the pixel signal voltage Vx and the reference signal SLP_ADC coincide with each other.

The comparison pulse COMP is supplied to the not-shown data-storage control unit 500 (see FIG. 5). Information on the comparison pulse COMP changed to the L level is logically inverted by the inverter 502 and supplied to one input terminal of the NAND gate 520 as information on the comparison pulse COMP changed to the H level.

If the other input terminal of the NAND gate 520 is at the H level when a blackening phenomenon is not detected by the blackening detecting unit 400, the NAND gate 520 changes an output thereof to the L level on the basis of the information on the comparison pulse COMP changed to the H level.

Consequently, even if the data-storage control unit 500 is added, as long as a blackening phenomenon is not detected by the blackening detecting unit 400, information of a result of the comparison between the reference signal SLP_ADC and the pixel signal voltage Vx by the voltage comparing unit 252 is directly notified to circuits (the counter unit 254, etc.) at the post-stage.

The comparator reset signal PSET_ADC is supplied to temporarily connect (short-circuit) the gates and the drains of the transistors 303 and 304 of the differential transistor pair unit 302 and form a diode connection. An input of the transistor for amplification 42 of the unit pixel 3 added with an offset component of the transistor 304 is held at the input terminal (the gate) of the transistor 304. Then, the reference signal SLP_ADC is inputted to the input terminal to start comparison of the pixel signal Vx and the reference signal SLP_ADC. In this way, because an operating point of the voltage comparing unit 252 is set at a readout potential of the pixel signal for each of the unit pixels 3, the influence of the fluctuation in the reset level Srst is reduced.

A reference component has fluctuation and, when a gain is increased, the fluctuation is increased by the gain. Therefore, when a comparison period is reduced, it is likely that the reference component exceeds a comparable range and a correct comparison cannot be performed. In order to prevent such a problem, when comparison processing and count processing are performed for the reference component, first, the voltage comparing unit 252 (more specifically, the comparing unit 301) is reset to an operation reference value for reading out the reference component. Thereafter, the reference signal SLP_ADC is supplied to the comparing unit 301 and then, the comparison processing and the count processing are started. However, when the comparing unit 301 is reset to the operation reference value, occurrence of kTC noise is anticipated. Therefore, when the comparison processing and the count processing are performed for the signal level Ssig (i.e., the signal component Vsig), the comparing unit 301 is not reset and the reference signal SLP_ADC is immediately supplied to the comparing unit 301 to start the comparison processing and the count processing.

<Operations of the Voltage Comparing Unit, the Blackening Detecting Unit, and the Data-Storage Control Unit>

Figure 8A:
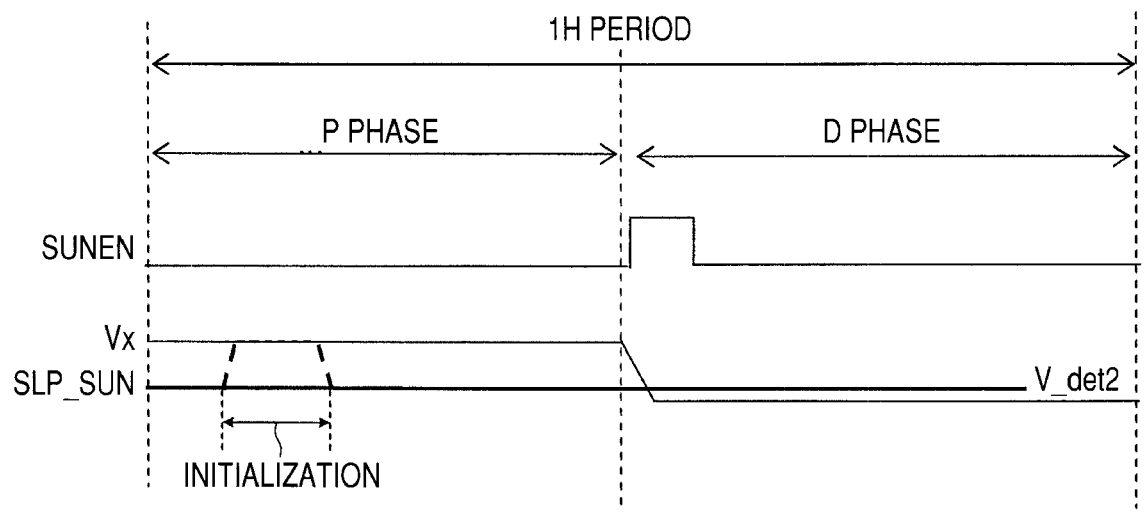
FIG. 8A is a diagram showing a signal timing example in the determination of presence or absence of occurrence of the blackening phenomenon according to the D phase level.
Figure 8B:
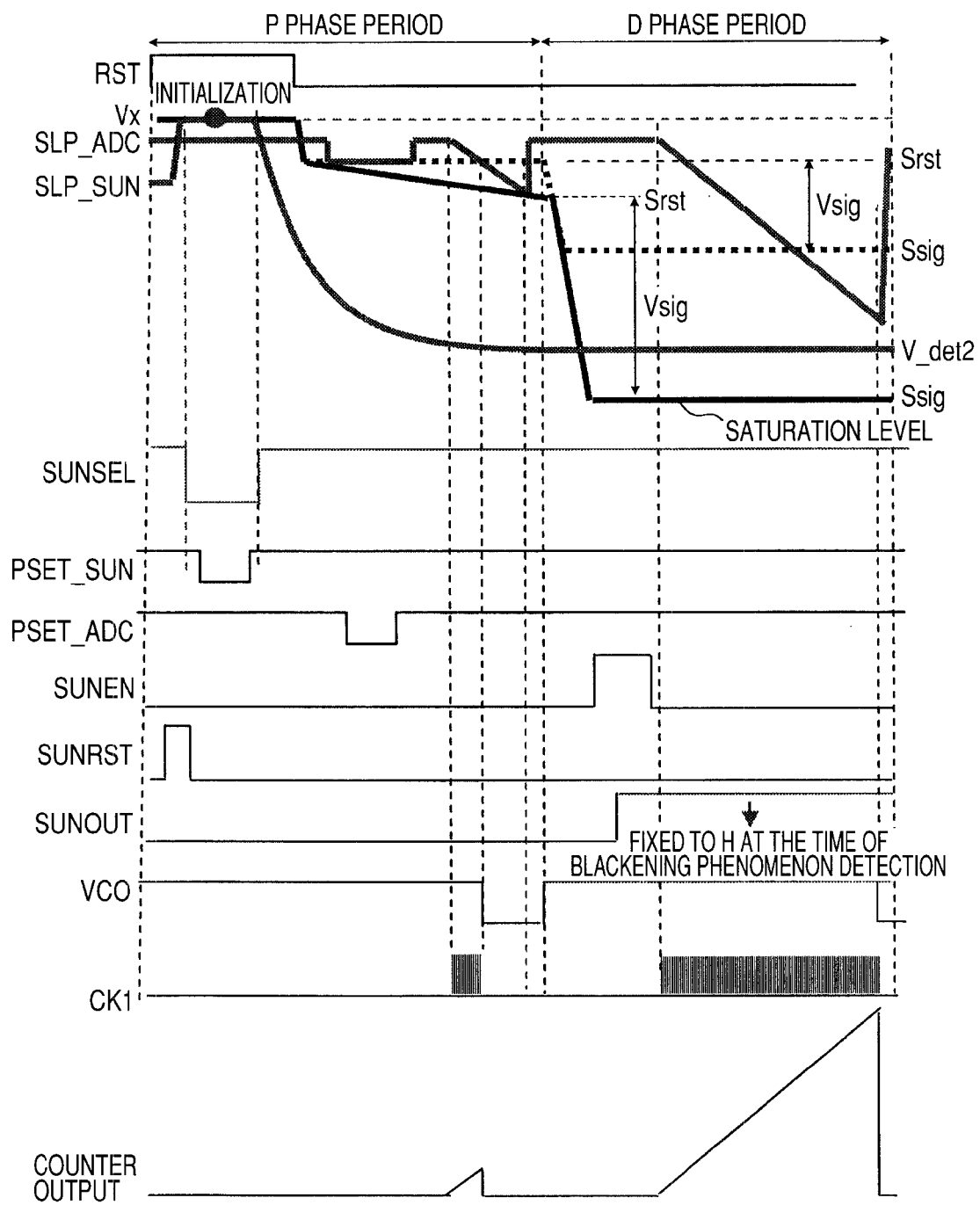
FIG. 8B is another diagram showing the signal timing example in the determination of presence or absence of occurrence of the blackening phenomenon according to the D phase level.

FIGS. 7A and 7B and FIGS. 8A and 8B are diagrams for explaining operation examples of the voltage comparing unit 252, the blackening detecting unit 400, and the data-storage control unit 500. FIGS. 7A and 7B are diagrams for explaining a difference between a case in which presence or absence of occurrence of a blackening phenomenon is determined according to a P phase level of the pixel signal voltage Vx and a case in which presence or absence of occurrence of a blackening phenomenon is determined according to a D phase level (i.e., the signal level Ssig) of the pixel signal voltage Vx. FIGS. 8A and 8B are diagrams showing a signal timing example in the case in which presence or absence of occurrence of the blackening phenomenon is determined according to the D phase level (i.e., the signal level Ssig) of the pixel signal voltage Vx.

In FIG. 7A (1), a relation between an amount of light made incident on the charge generating unit 32 and a signal output (signal component Vsg=signal level Ssig−reset level Srst) is shown. In FIG. 7A (2), a relation between a state of change in a 1H period of the pixel signal voltage Vx and a determination level of a blackening phenomenon at normal time when the blackening phenomenon does not occur and at the time when the blackening phenomenon occurs is shown. In FIG. 7B (1), a relation among the reference signal SLP_ADC, the pixel signal voltage Vx, and the determination level V_det in the case in which presence or absence of occurrence of a blackening phenomenon is determined according to the P phase level is shown. In FIG. 7B (2), a relation among the reference signal SLP_ADC, the pixel signal voltage Vx, and the determination level V_det in the case in which presence or absence of occurrence of a blackening phenomenon is determined according to the D phase level of the pixel signal voltage Vx is shown.

As shown in FIG. 7A (1), as an amount of light increases, the signal component Vsig indicated by a difference between the reset level Srst and the signal level Ssig linearly increases. This is a process of reading out the pixel signal voltage Vx in which, first, after the floating diffusion portion 38 is brought into a reset state, the reset level Srst is outputted (the P phase), then signal charges accumulated in the charge generating unit 32 are transferred to the floating diffusion portion 38, and an operation for reading out the signal level Ssig is appropriately performed. In this state, like the pixel signal voltage Vx indicated by a dotted line in FIG. 7A (2), the reset level Srst (the P phase level) of the pixel signal voltage Vx is fixed regardless of the elapse of time and a linear output is obtained as the signal component Vsig.

When an amount of incident light exceeds a fixed amount of light P1, the signal level Ssig is saturated. A saturated signal level becomes an upper limit of the signal component indicated by a difference between the reset level Srst and the signal level Ssig, and the fixed saturated signal level is outputted. Even if an amount of light exceeding that of light P1 is made incident, the signal component Vsig does not change from the saturated signal level for a while. The saturated signal level depends on capacities of the charge generating unit 32 and the floating diffusion portion 38 of the unit pixel 3, a characteristic of the source follower of the unit pixel 3, and the like.

When an amount of incident light exceeds an amount of light P2, after the floating diffusion portion 38 is reset, photoelectric conversion occurs in the floating diffusion portion 38 while the reset level Srst is being outputted. This makes it difficult to keep the reset level Srst in a fixed state. In this state, like the pixel signal voltage Vx indicated by a solid line in FIG. 7A (2), the reset level Srst (the P phase level) of the pixel signal voltage Vx falls as time elapses. As a result, the signal component Vsig indicated by a difference between the reset level Srst and the signal level Ssig falls regardless of the fact that intense light is incident. This is because, since signal component Vsig is a difference between the D phase level and the P phase level, the signal component Vsig decreases by an amount of fall in the P phase level. Therefore, an image looks black regardless of the fact that the light is very bright, i.e., a blackening phenomenon occurs.

To prevent such a blackening phenomenon from appearing in the signal component Vsig, the blackening phenomenon is detected to correct information of the signal component Vsig. As an example, it is detected whether incident light is extremely intense according to whether the signal level Ssig is in an area of saturation or immediately before the area of saturation or whether the reset level Srst is in an area of change. Processing for acquiring the signal component Vsig is corrected on the basis of a result of the detection.

The determination on whether the reset level Srst is in the area of change is performed by comparing the P phase level and a determination level V_det1 as shown in FIG. 7A (2) and FIG. 7B (1). Accordingly, when the detection is performed in the P phase, the determination level V_det1 is set to a potential, which is ΔV level lower than the appropriate reset level Srst by taking into account a pixel fluctuation component of the reset level Srst and a margin (ΔV). Therefore, while it is possible to treat the signal component Vsig as a proper signal up to the saturation level (the light amount P2), a darkening phenomenon is once confirmed as indicated by the amounts of light between P2 and P3 in FIG. 7A (1).

On the other hand, the determination on whether the signal level Ssig is in the area of saturation or immediately before the area of saturation is performed by comparing the D phase level and a determination level V_det2 as shown in FIG. 7A (2) and FIG. 7B (2).

More specifically, as shown in FIG. 8A, the control signal SUNEN is set to active H in a fixed period immediately after the control signal SUNEN enters a processing period in the D phase. A point is detected when the pixel signal voltage Vx crosses the determination level V_det2 of the reference signal SLP_SUN in a transition period in which the pixel signal voltage Vx reaches the signal level Ssig from the reset level Srst. In other words, the detection is performed before AD conversion in the D phase. When the pixel signal voltage Vx coincides with the determination level V_det2 in a process of reaching the signal level Ssig, an output of the comparing unit 401 changes to the L level. At this point, since the control signal SUNEN is at active H, the blackening determination signal SUNOUT from the buffer unit 450 changes to the H level.

In order to perform the detection before the signal component Vsig completely increases to the saturation level, as shown in FIG. 7A (2) and FIG. 7B (2), a potential of the determination level V_det2 is set higher than the saturation level. As a result, as indicated by V_det2 in FIG. 7A (1), in principle, darkening does not occur. However, it is difficult to treat the signal component Vsig equal to or higher than V_det2 (with an amount of light equal to or larger than P5) as a proper signal. Therefore, a dynamic range is narrowed.

The operation for determining a blackening phenomenon in this embodiment has a characteristic that, first, as shown in FIG. 7A (2), the reference signal SLP_SUN is initialized by the reset level Srst of the pixel signal voltage Vx. More specifically, as explained with reference to FIG. 5, the comparator reset signal PSET_SUN is activated to initialize the comparing unit 401 in a period in which the reference signal SLP_SUN is at the initial value V_ini. This operation has an advantage same as that of the operation for activating the comparator reset signal PSET_ADC with respect to the comparing unit 301 before the comparison processing in the P phase in the voltage comparing unit 252 to initialize the comparing unit 401.

When presence or absence of a blackening phenomenon is determined, even if a noise pulse level and the reset level Srst during pixel reset period fluctuate for each of the unit pixels 3, a potential of the reference signal SLP_SUN (more specifically, the initial value V_ini) is automatically set in the comparing unit 401 following the fluctuation by activating the comparator reset signal PSET_SUN. Consequently, the determination level V_det is set to a potential corresponding to the noise pulse level and the reset level Srst during pixel reset period. Therefore, it is possible to control the influence of fluctuation during reset in the pixel signal voltage Vx in the respective columns. As a result, it is possible to control fluctuation in the columns when it is determined whether a blackening phenomenon occurs. As a result, it is possible to uniformly cause white dropouts on a screen when intense light such as the sunlight is made incident thereon.

In an example shown in FIG. 7A (2), only one of the analog switches 482_2 to 482_5 in the reference-signal generating unit 460 is turned on to almost immediately change the reference signal SLP_SUN from the initial value V_ini to the determination level V_det2. However, as shown in FIG. 8B, the analog switches 482_2 to 482_5 may be turned on in order from a high potential side to change the reference signal SLP_SUN in a stepwise manner.

Specific Operation Examples

Overviews of operations of the voltage comparing unit 252, the blackening detecting unit 400, and the data-storage control unit 500 are explained with reference to FIG. 8B. In an example explained here, the counter unit 254 performs count processing in the up-count mode in both the P phase and the D phase and transfers count values (n bits) in the respective phases to the digital arithmetic unit 29 individually. In other words, the AD conversion processing in the third processing example is applied.

First, in the beginning of a processing cycle, the reset signal SUNRST is set to active H to reset the latch circuit 510. In this way, an output of the inverter 516 is set to the H level. Thereafter, the reset signal SUNRST is set to inactive L. In other words, before the AD conversion processing for the P phase level and the D phase level, in order to reset a state of latch by the latch circuit 510, the control signal SUNRST is temporarily set to the H level and released.

Thereafter, the comparator reset signal PSET_SUN is activated to initialize the comparing unit 401 in a period in which the reference signal SLP_SUN is at the initial value V_ini. In this way, the determination level V_det for a blackening phenomenon is set to a level suitable for a reset state of the respective unit pixels 3. Therefore, it is possible to prevent, in terms of a circuit, fluctuation in detection of the blackening phenomenon.

Moreover, the comparator reset signal PSET_ADC is activated to initialize the comparing unit 301 in a period in which the reference signal SLP_ADC is at the reset level.

Thereafter, while the reference signal SLP_ADC is changed from the initial value at a predetermined tilt, the P phase level (the reset level Srst) of the pixel signal voltage Vx and the reference signal SLP_ADC are compared in the voltage comparing unit 252. In the beginning of the comparison processing, since a voltage of the reference signal SLP_ADC is higher than the reset level Srst, the comparison pulse COMP is at the H level. If a blackening phenomenon does not occur, like the pixel signal voltage Vx indicated by a dotted line in the figure, the reset level Srst is fixed in a period of the comparison processing (practically, the AD conversion processing) in the P phase. The voltage comparing unit 252 can surely detect a point when the reset level Srst and the reference signal SLP_ADC coincide with each other. At the detected point, the comparison pulse COMP is changed to the L level.

For example, the counter unit 254 gets a count clock CK1 with the comparison pulse COMP and supplies the count clock CK1 to a counting circuit (e.g., a cascade of flip-flops) in the inside thereof. Regardless of the comparison pulse COMP, when count-operation-enabled periods in the respective phases pass, the counter unit 254 stops the supply of the count clock CK1 to the counting circuit.

For example, in a period in which the comparison pulse COMP is at the H level, since the count clock CK1 is supplied to the counting circuit, the counting circuit can count a number of count clock CK1. However, when the comparison pulse COMP changes to the L level, since the supply of the count clock CK1 is stopped, the counting circuit stops counting processing and keeps a count value at that point.

Consequently, the counter unit 254 starts count processing at a point when the reference signal SLP_ADC starts to change. When the comparison pulse COMP changes to the L level, the counter unit 254 keeps a count value Drst_cnt at that point. The count value Drst_cnt is transferred to the digital arithmetic unit 29 as AD conversion data in the P phase.

Thereafter, in a processing period in the D phase, while the reference signal SLP_ADC is changed from the initial value at a predetermined tilt, the D phase level (the signal level Ssig) of the pixel signal voltage Vx and the reference signal SLP_ADC are compared in the voltage comparing unit 252. In the beginning of the comparison processing, since a voltage of the reference signal SLP_ADC is higher than the signal level Ssig, the comparison pulse COMP is at the H level. If a blackening phenomenon does not occur, like the pixel signal voltage Vx indicated by a dotted line in the figure, the signal level Ssig obtained by superimposing the signal component Vsig on the reset level Srst, which is at a fixed level during the comparison processing period in the P phase, appears. The voltage comparing unit 252 can surely detect a point when the signal level Ssig and the reference signal SLP_ADC coincide with each other. The comparison pulse COMP is changed to the L level at the detected point. The counter unit 254 starts count processing at a point when the reference signal SLP_ADC starts to change. When the comparison pulse COMP changes to the L level, the counter unit 254 holds a count value Dsig_cnt at that point. The count value Dsig_cnt is transferred to the digital arithmetic unit 29 as AD conversion data in the D phase.

The digital arithmetic unit 29 acquires AD conversion data Dsig(=Dsig_cnt−Drst_cnt) of the signal component Vsig according to differential processing between the AD conversion data Drst_cnt in the P phase and the AD conversion data Dsig_cnt in the D phase.

On the other hand, when a blackening phenomenon occurs, first, in the comparison processing period in the P phase, like the pixel signal voltage Vx indicated by a solid line in the figure, the reset level Srst falls as time elapses. Therefore, depending on a degree of the fall, the voltage comparing unit 252 can detect or may not be able to detect a point when the reset level Srst and the reference signal SLP_ADC coincide with each other. In an example indicated by the solid line shown in the figure, the voltage comparing unit 252 may not be able to detect a point when the reset level Srst and the reference signal SLP_ADC coincide with each other.

When the voltage comparing unit 252 can detect a point when the reset level Srst and the reference signal SLP_ADC coincide with each other, the voltage comparing unit 252 changes the comparison pulse COMP to the L level at that point. The counter unit 254 starts count processing at a point when the reference signal SLP_ADC starts to change. When the comparison pulse COMP changes to the L level, the counter unit 254 holds the count value Dsig_cnt at that point. The count value Dsig_cnt is transferred to the digital arithmetic unit 29 as AD conversion data in the P phase.

When the voltage comparing unit 252 may not be able to detect a point when the reset level Srst and the reference signal SLP_ADC coincide with each other, the voltage comparing unit 252 keeps the comparison pulse COMP at the H level even if a processing period in the P phase passes. In this case, when the count-operation-enabled period passes, the supply of the count clock CK1 to the counting circuit of the counter unit 254 is stopped. Consequently, the counter unit 254 starts count processing at a point when the reference signal SLP_ADC starts to change. When the count-operation-enabled period in the P phase passes, the counter unit 254 holds a count value Drst_cnt (=Drm) corresponding to the count-operation-enabled period in the P phase. The count value Drst_cnt is transferred as AD conversion data in the P phase.

Thereafter, in the processing period in the D phase, while the reference signal SLP_ADC is changed from the initial value at a predetermined tilt, the D phase level (the signal level Ssig) of the pixel signal voltage Vx and the reference signal SLP_ADC are compared. In the beginning of the comparison processing, since a voltage of the reference signal SLP_ADC is higher than the signal level Ssig, the comparison pulse COMP is at the H level. When a blackening phenomenon occurs, like the pixel signal voltage Vx indicated by a solid line in the figure, the signal level Ssig obtained by superimposing the signal component Vsig on a final value of the reset level Srst, which gradually falls during the comparison period in the P phase, appears. The voltage comparing unit 252 attempts to detect a point when the signal level Ssig and the reference signal SLP_ADC coincide with each other. However, depending on a degree of a fall in the final value of the reset level Srst, the voltage comparing unit 252 can detect or may not be able to detect a point when the signal level Ssig and the reference signal SLP_ADC coincide with each other. In an example indicated by the solid line shown in the figure, the voltage comparing unit 252 may not be able to detect a point when the signal level Ssig and the reference signal SLP_ADC coincide with each other.

When the voltage comparing unit 252 succeeds in detecting a point when the signal level Ssig and the reference signal SLP_ADC coincide with each other, the voltage comparing unit 252 changes the comparison pulse COMP to the L level at that point. The counter unit 254 starts count processing at a point when the reference signal SLP_ADC starts to change. When the comparison pulse COMP changes to the L level, the counter unit 254 holds the count value Dsig_cnt at that point. The count value Dsig_cnt is transferred to the digital arithmetic unit 29 as AD conversion data in the D phase.

When the voltage comparing unit 252 fails in detecting a point when the signal level Ssig and the reference signal SLP_ADC coincide with each other, the voltage comparing unit 252 keeps the comparison pulse COMP at the H level even if the processing period in the D phase passes. In this case, when the count-operation-enabled period passes, the supply of the count clock CK1 to the counting circuit of the counter unit 254 is stopped. Consequently, the counter unit 254 starts count processing at a point when the reference signal SLP_ADC starts to change. When the count-operation-enabled period in the D phase passes, the counter unit 254 holds the count value Dsig_cnt (=Dsm) corresponding to the count-operation-enabled period in the D phase. The count value Dsig_cnt is transferred to the digital arithmetic unit 29 as AD conversion data in the D phase.

The digital arithmetic unit 29 attempts to acquire the AD conversion data Dsig of the signal component Vsig according to the differential processing between the AD conversion data Drst_cnt in the P phase and the AD conversion data Dsig_cnt in the D phase. In this case, as it is understood from the above explanation, depending on a degree of a potential fall during a blackening phenomenon in the P phase processing period, each of the AD conversion data Drst_cnt in the P phase and the AD conversion data Dsig_cnt in the D phase can take two kinds of values. Therefore, the AD conversion data Dsig of the signal component Vsig obtained by the differential processing in the digital arithmetic unit 29 can take four (=2×2) kinds of values.

On the other hand, in parallel to the AD conversion processing (the comparison processing and the count processing) by the voltage comparing unit 252 and the counter unit 254, the blackening detecting unit 400 determines presence of a blackening phenomenon. When the blackening detecting unit 400 detects that a blackening phenomenon, which is a large light-amount imaging condition, occurs, the blackening detecting unit 400 sets the blackening determination signal SUNOUT to the H level.

For example, when a blackening phenomenon occurs, the comparing unit 401 of the blackening detecting unit 400 detects, in the D phase processing period, a point when the pixel signal voltage Vx coincides with the determination level V_det of the reference signal SLP_SUN in a process of changing to the signal level Ssig. In other words, detection of a blackening phenomenon is performed before the AD conversion processing in the D phase. When the comparing unit 401 detects the point, the comparing unit 401 changes an output to the L level. Information on the output changed to the L level is notified to one terminal of the buffer unit 450.

In this case, the control signal SUNEN supplied to the other terminal of the buffer unit 450 is at the L level in the beginning. Therefore, the blackening detection information SUNOUT, which is an output of the buffer unit 450, is kept at the L level regardless of the output (L or H) of the comparing unit 401. The buffer unit 350 changes the blackening detection information SUNOUT to the H level in synchronization with timing when the control signal SUNEN is switched to the H level.

When the blackening detection information SUNOUT changes to the H level, an output of the latch circuit 510 of the data-storage control unit 500 is maintained at the L level. Therefore, the control signal VCO replacing the comparison output COMP is fixed at the H level regardless of the comparison pulse COMP of the voltage comparing unit 252. In other words, the data-storage control unit 500 fixes the control signal VCO in a logical state before the comparison operation is started.

Therefore, the counter unit 254 gets the count clock CK1 with the control signal VCO rather than the comparison pulse COMP and supplies the count clock CK1 to the counting circuit (e.g., the cascade of flip-flops) in the inside thereof. Then, when a blackening phenomenon does not occur, the counter unit 254 can hold, in both the P phase and the D phase, the count values Drst_cnt and Dsig_cont equivalent to AD conversion values in the respective phases at substantially the same timing as that of the comparison pulse COMP.

When a blackening phenomenon occurs, first, in the P phase processing, when the voltage comparing unit 252 can detect a point when the reset level Srst and the reference signal SLP_ADC coincide with each other, the counter unit 254 can hold the count value Drst_cnt equivalent to an AD conversion value at substantially the same timing as that of the comparison pulse COMP. When the voltage comparing unit 252 may be unable to detect a point when the reset level Srst and the reference signal SLP_ADC coincide with each other, the counter unit 254 holds the count value Drst_cnt (=Drm) corresponding to the count-operation-enabled period in the P phase.

On the other hand, in the D phase processing, when the blackening detecting unit 400 detects a blackening phenomenon, the control signal VCO is fixed to the H level regardless of the comparison pulse COMP of the voltage comparing unit 252. Therefore, the counter unit 254 holds the count value Dsig_cnt (=Dsm) corresponding to the count-operation-enabled period in the D phase regardless of whether the voltage comparing unit 252 can detect a point when the signal level Ssig and the reference signal SLP_ADC coincide with each other.

Consequently, the AD conversion data Dsig of the signal component Vsig obtained by the differential processing in the digital arithmetic unit 29 can take two (=2×1) kinds of values. Therefore, pixel data that should be used during blackening detection is still unstable.

In this embodiment, blackening phenomenon determination processing is performed before the AD conversion processing in the D phase to specify presence or absence of a blackening phenomenon. Therefore, when the AD conversion processing in the P phase is performed in the voltage comparing unit 252 and the counter unit 254, as described above, the AD conversion data of the signal level Ssig typically represents the count value Dsig_cont (=Dsm) corresponding to the count-operation-enabled period in the D phase. Since Dsm is equivalent to the saturation level, it is conceivable to use Dsm (the maximum count number) as correction data when a blackening phenomenon is detected.

Therefore, on condition that the blackening detecting unit 400, which is an example of the imaging-condition determining unit, determines that the large light-amount imaging condition is satisfied, the data-storage control unit 500 corrects the control signal VCO, which replaces the comparison output (the comparison pulse COMP) by the voltage comparing unit 252, to a state same as that before starting the comparison. The data-storage control unit 500 performs count processing in the counter unit 254 in a count-operation-enabled period defined by a comparison result after the correction, holds a count value, and performs predetermined correction using the count value held in the counter unit 254.

For example, the data-storage control unit 500 notifies the digital arithmetic unit 29 of the control signal VCO to control execution of the differential processing in the digital arithmetic unit 29. When the digital arithmetic unit 29 receives the count value Dsig_cnt, the digital arithmetic unit 29 performs differential processing between the count value Drst_cnt and the count value Dsig_cnt when the control signal VCO is at the L level (a blackening phenomenon is not detected). However, the digital arithmetic unit 29 uses the count value Dsig_cnt as correction data when the control signal VCO is at the H level.

In this way, when a blackening phenomenon is detected, the differential processing in the digital arithmetic unit 29 is not performed and the count value Drst_cnt in the D phase is used. This makes it possible to surely set pixel data during blackening detection to the count value Drst_cnt (=Dsm) corresponding to the count-operation-enabled period in the D phase and to display a portion in white where the blackening phenomenon occurs.

Even if extremely intense light such as the sunlight is made incident on the charge generating unit 32 of the unit pixel 3, since a pixel data level after the correction processing in the digital arithmetic unit 29 is a white level, it is possible to prevent a blackening phenomenon in which a brightest portion is darkened.

In the example explained above, when the blackening phenomenon determination in the D phase is performed, the differential processing is not performed when a blackening phenomenon is detected and, when a blackening phenomenon is detected, an AD conversion result in the D phase under the control signal VCO, i.e., the count value Drst_cnt (=Dsm) corresponding to the count-operation-enabled period in the D phase, is used as pixel data (correction data). However, this does not always have to be performed. For example, pixel data may be converted (corrected) into other levels determined in advance equivalent to the saturation level.

The treatment of the correction data at the time when a blackening phenomenon is detected, which is performed when count processing is performed in the up-count mode in both the P phase and the D phase and count values in the respective phases are individually transferred to the digital arithmetic unit 29, is explained with reference to FIG. 8A. However, in performing control to prevent data in a state of blackening phenomenon occurrence from being transferred to the output circuit 28, concerning what kind of control is performed and how correction data is created, other forms can be taken according to, for example, whether the differential processing is performed in the column AD circuit 250 or which of the first to third processing examples is applied as AD conversion processing.

Modifications of the embodiments are explained. Unless specifically noted otherwise, in the respective modifications, AD conversion processing (in particular, count processing) is performed under the control signal VCO replacing the comparison pulse COMP.

<Correction Processing for Pixel Data: First Modification>

For example, if the differential processing is performed in the column AD circuit 250 and the AD conversion processing in the first example is applied (a first modification), during the processing in the D phase, it is acceptable to reset the digital value Drst of the reset level Srst acquired during readout in the P phase and AD conversion to the initial value "0" before the count processing in the D phase and to start counting, rather than starting the count processing in a mode opposite to the P phase from the digital value Drst. In this way, a count value held in the counter unit 254 after the processing in the D phase is set to the maximum count number Dsm corresponding to the count-operation-enabled period in the D phase and is transferred to the output circuit 28 as correction data when a blackening phenomenon is detected.

<Correction Processing for Pixel Data: Second Modification>

When the differential processing is performed in the column AD circuit 250 and the AD conversion processing in the second processing example is applied (a second modification), in one of the P phase and the D phase, it is necessary to take into account that count processing is performed in a period from a point when the reference signal SLP_ADC and the pixel signal voltage Vx become identical to a point when the processing reaches a maximum AD conversion period in that processing. This is because, when the AD conversion processing (in particular, the count processing) is performed under the control signal VCO replacing the comparison pulse COMP, the control signal VCO is fixed to the H level when a blackening phenomenon is detected and, as a result, it is difficult to perform the count processing in a period from a point when the reference signal SLP_ADC and the pixel signal voltage Vx become identical to a point when the processing reaches a maximum AD conversion period in that processing (a count-operation-enabled period).

More specifically, the principle (the first example) shown in FIG. 3A and the principle (the second example) shown in FIG. 3B are reflected in the second processing example. In the first example, practically, the processing in the D phase is the same as that performed when the AD conversion processing in the first processing example is applied. Therefore, when the AD conversion processing of the first example in the second processing example is applied, during the processing in the D phase, it is acceptable to reset the digital value Drst of the reset level Srst acquired during readout in the P phase and AD conversion to the initial value "0" before the count processing in the D phase, and to start counting, rather than starting the count processing in a mode opposite to the P phase from the digital value Drst. In this way, a count value held in the counter unit 254 after the processing in the D phase is set to the maximum count number Dsm corresponding to the countoperation-enabled period in the D phase and is transferred to the output circuit 28 as correction data when a blackening phenomenon is detected.

On the other hand, in the second example, it is attempted to perform, during the processing in the D phase, the count processing in a period from a point when the reference signal SLP_ADC and the pixel signal voltage Vx become identical to a point when the processing reaches a maximum AD conversion period in that processing. Therefore, actually, the count processing is not performed during the processing in the D phase and, as a result, the digital data value Drst of the reset level Srst acquired during the readout in the P phase and the AD conversion is held in the counter unit 254 after the processing in the D phase.

Therefore, when the AD conversion processing of the second example in the second processing example is applied, during the processing in the D phase, a count-operation-enabled period is set to a period from a point when the reference signal SLP_ADC starts to change from the initial value SLP_ini to a point when the reference signal SLP_ADC and the pixel signal voltage Vx (the signal level Ssig) become identical. This can be controlled by the count-phase switching unit 260.

Therefore, the data-storage control unit 500 notifies the count-phase switching unit 260 of the control signal VCO to control execution of setting processing in the count-operation-enabled period in the count-phase switching unit 260. The count-phase switching unit 260 performs normal processing for setting a count-operation-enabled period when the control signal VCO is at the L level (a blackening phenomenon is not detected). However, when the control signal VCO is at the H level (when a blackening phenomenon is detected), during the processing in the D phase, the count-phase switching unit 260 sets a count-operation-enabled period to a period from a point when the reference signal SLP_ADC starts to change from the initial value SLP_ini to a point when the reference signal SLP_ADC and the pixel signal voltage Vx (the signal level Ssig) become identical.

In this way, although a count mode is different, practically, the processing is the same as that of the first processing example or that of the first example in the second processing example. Therefore, it is acceptable to reset the digital value Drst to the initial value "0" before the count processing and, then, start counting. In this way, a count value held in the counter unit 254 after the processing in the D phase is set to the maximum count number Dsm corresponding to the count-operation-enabled period in the D phase and is transferred to the output circuit 28 as correction data when a blackening phenomenon is detected.

Modification of a Specific Operation Example

FIG. 9 is a diagram showing an example of signal timing in determining presence or absence of occurrence of a blackening phenomenon according to the P phase level (i.e., the reset level Srst) of the pixel signal voltage Vx and is a diagram for explaining a modification of a specific operation example. In the example, the counter unit 254 performs count processing in the up-count mode in both the P phase and the D phase and transfers count values (n bits) in the respective phases to the digital arithmetic unit 29 individually, i.e., the AD conversion processing in the third processing example is applied.

The explanation referring to FIGS. 7A, 7B, 8A and 8B indicates that this embodiment has a characteristic that, during the operation for determining a blackening phenomenon, the reference signal SLP_SUN is initialized by the reset level Srst of the pixel signal voltage Vx. This mechanism can be applied not only when it is determined whether a blackening phenomenon occurs during the D phase processing but also when it is determined whether a blackening phenomenon occurs during the P phase processing. This modification of a specific operation example indicates this point.

In the example shown in FIG. 9, the analog switches 482_2 to 482_5 in the reference-signal generating unit 460 are turned on in order from the high potential side to change the reference signal SLP_SUN in a stepwise manner. However, only one of the analog switches 482_2 to 482_5 may be turned on to substantially immediately change the reference signal SLP_SUN from the initial value V_ini to the determination level V_det2.

When a blackening phenomenon is detected by the blackening detecting unit 400 and the blackening detection information SUNOUT is set to the H level during the P phase processing, the data-storage control unit 500 fixes the control signal VCO, which replaces the comparison output COMP, to the H level same as that in the logical state before starting the comparison operation regardless of the comparison pulse COMP of the voltage comparing unit 252.

Therefore, in both the P phase processing and the D phase processing, the counter unit 254 holds the count value Drst_cont (=Drm) corresponding to the count-operation-enabled period in the P phase and the count value Dsig_cnt (=Dsm) corresponding to the count-operation-enabled period in the D phase as AD conversion data in the respective phases, regardless of whether the voltage comparing unit 252 can detect a point when the reset level Srst or the signal level Ssig coincide with the reference signal SLP_ADC.

The AD conversion data Dsm (the maximum count number in the P phase processing) and Drm (the maximum count number in the D phase processing) are transferred to the digital arithmetic unit 29. Consequently, the AD conversion data Dsig of the signal component Vsig obtained by the differential processing in the digital arithmetic unit 29 can surely take one kind of value of "Dsm−Drm". Therefore, simply by using "Dsm−Drm" as correction data during blackening detection, pixel data during blackening detection is stabilized. "Dsm−Drm" may be generally considered the saturation level. A portion where a blackening phenomenon occurs can be displayed in white.

Even if extremely intense light such as the sunlight is made incident on the charge generating unit 32 of the unit pixel 3, since a pixel data level after the correction processing in the digital arithmetic unit 29 is a white level, it is possible to prevent a blackening phenomenon in which a brightest portion is darkened.

In the example explained above, when the blackening phenomenon determination in the P phase is performed, "Dsm−Drm" is used as pixel data (correction data) at the time when a blackening phenomenon is detected. However, this does not always have to be performed. For example, pixel data may be converted (corrected) into other levels determined in advance equivalent to the saturation level.

The treatment of the correction data at the time when a blackening phenomenon is detected, which is performed when count processing is performed in the up-count mode in both the P phase and the D phase and count values in the respective phases are individually transferred to the digital arithmetic unit 29, is explained with reference to FIG. 9. However, in performing control to prevent data in a state of occurrence of a blackening phenomenon from being transferred to the output circuit 28, concerning what kind of control is performed and how correction data is created, other forms can be taken according to, for example, whether the differential processing is performed in the column AD circuit 250 or which of the first to third processing examples is applied as AD conversion processing. In this regard, the blackening phenomenon determination in the P phase is the same as the blackening phenomenon determination in the D phase. Although detailed explanation of other measures is omitted, processing only has to be performed by taking into account the matters that are taken into account in the respective modifications of the correction processing for pixel data when the blackening phenomenon determination in the D phase is performed.

<Imaging Apparatus>

Figure 10:
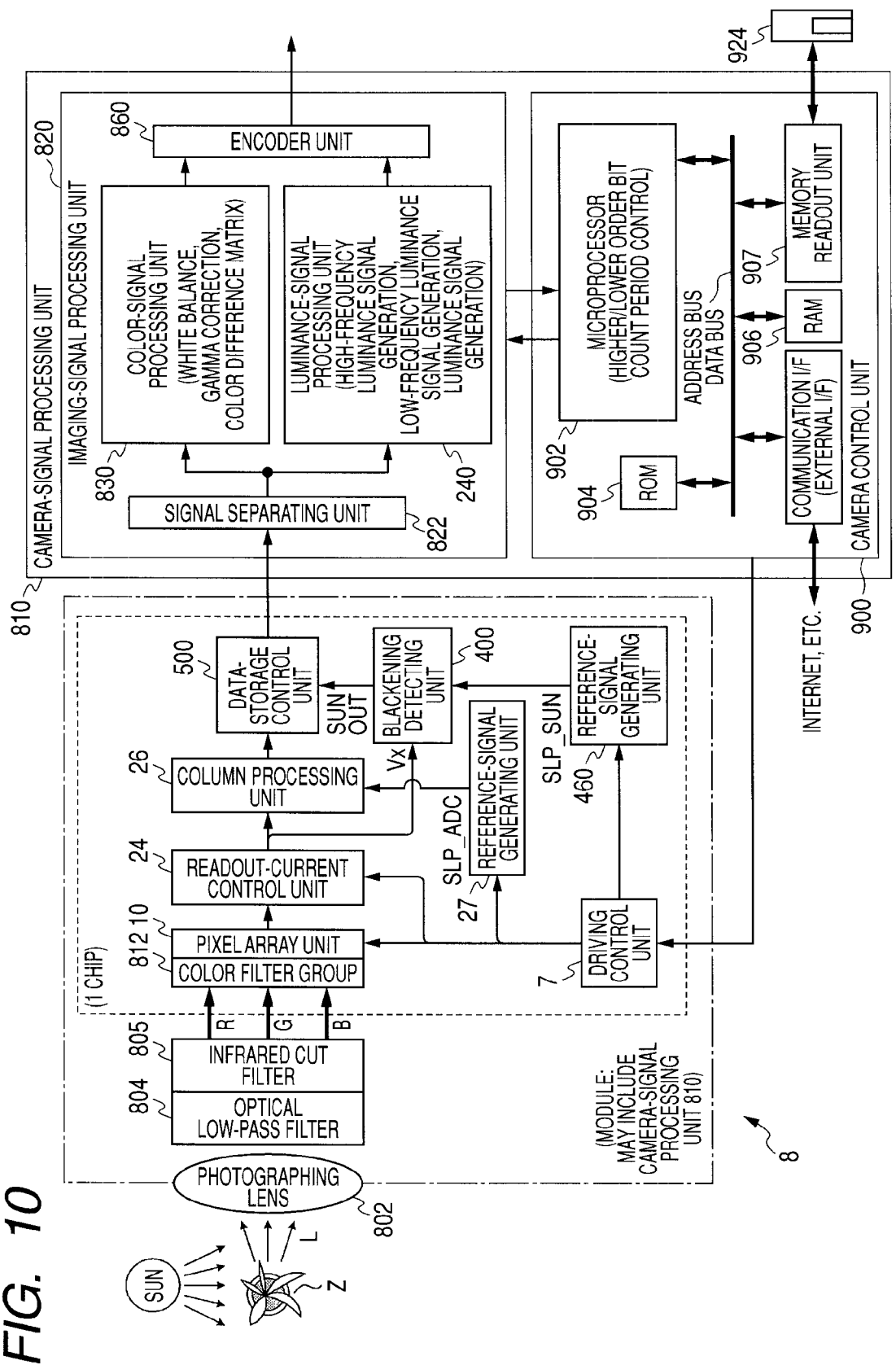
FIG. 10 is a diagram showing the schematic structure of an imaging apparatus that is an example of a physical information acquiring apparatus employing a mechanism same as that of the solid-state imaging device.

FIG. 10 is a diagram showing the schematic structure of an imaging apparatus as an example of a physical information acquiring apparatus employing a mechanism same as that of the solid-state imaging device 1 described above. This imaging apparatus 8 is an imaging apparatus that obtains a visible light color image. The mechanism of the solid-state imaging device 1 is applicable not only to a solid-state imaging device but also to an imaging apparatus. In this case, as the imaging apparatus, it is also possible to realize the mechanism that can control the influence of fluctuation in pixel signal voltage for each pixel during pixel reset period when it is determined whether a blackening phenomenon occurs.

In realizing the mechanism, for example, in control of generation of the reference signal SLP_ADC for executing the AD conversion of the reference-signal-comparison type and the reference signal SLP_SUN for blackening phenomenon determination or initialization for the comparing unit for blackening phenomenon determination, a main control unit on the outside can arbitrarily designate indication information for the control according to data setting for the communication/timing control unit 20.

Specifically, the imaging apparatus 8 includes a photographing lens 802 that guides light L, which bears an image of a subject Z under illumination such as a fluorescent lamp or the sunlight, to the imaging apparatus side and focuses the light L, an optical low-pass filter 804, a color filter group 812 in which, for example, color filters of R, G, and B are arranged in a Bayer array, the pixel array unit 10, the driving control unit 7 that drives the pixel array unit 10, the readout-current controlling unit 24 that controls an operation current of a pixel signal outputted from the pixel array unit 10, the column processing unit 26 that applies CDS processing, AD conversion processing, and the like to the pixel signal outputted from the pixel array unit 10, the reference-signal generating unit 27 that supplies the reference signal SLP_ADC to the column processing unit 26, and a camera-signal processing unit 810 that processes imaging data outputted from the column processing unit 26.

In addition, the imaging apparatus 8 includes the blackening detecting unit 400 that determines a blackening phenomenon, the reference-signal generating unit 460 that supplies the reference signal SLP_SUN to the blackening detecting unit 400, and the data-storage control unit 500 that adjusts a comparison output for AD conversion on the basis of the blackening detection information SUNOUT from the blackening detecting unit 400 in order to apply predetermined correction to an output signal to the camera-signal processing unit 810, such that a harmful effect due to the large light-amount imaging condition is suppressed in the output signal. The camera-signal processing unit 810 provided at a post-stage of the column processing unit 26 includes an imaging-signal processing unit 820 and a camera control unit 900 functioning as a main control unit that controls the entire imaging apparatus 8.

The imaging-signal processing unit 820 includes a signal separating unit 822 that has a primary color separating function for separating, when a filter other than a primary color filter is used as a color filter, a digital imaging signal supplied from an AD conversion function unit of the column processing unit 26 into primary color signals of R (red), G (green), and B (blue) and a color-signal processing unit 830 that applies signal processing to a color signal C on the basis of the primary color signals R, G, and B separated by the signal separating unit 822. The imaging-signal processing unit 820 also includes a luminance-signal processing unit 840 that applies signal processing to a luminance signal Y on the basis of the primary color signals R, G, and B separated by the signal separating unit 822 and an encoder unit 860 that generates a video signal VD on the basis of the luminance signal Y and the color signal C.

Although not shown in the figure, the color-signal processing unit 830 includes a white balance amplifier, a gamma correction unit, and a color difference matrix unit. Although not shown in the figure, the luminance-signal processing unit 840 includes a high-frequency luminance-signal generating unit that generates a luminance signal YH including a component with a relatively high frequency on the basis of a primary color signal supplied from a primary-color separation function unit of the signal separating unit 822, a low-frequency luminance-signal generating unit that generates a luminance signal YL including only a component with a relatively low frequency on the basis of a primary color signal with an adjusted white balance supplied from the white balance amplifier, and a luminance-signal generating unit that generates a luminance signal Y on the basis of the two kinds of luminance signals YH and YL and supplies the luminance signal Y to the encoder unit 860.

The encoder unit 860 digitally modulates color difference signals R-Y and B-Y with a digital signal corresponding to a color signal sub-carrier and, then, combines the color difference signals R-Y and B-Y with the luminance signal Y generated by the luminance-signal processing unit 840 to convert the color difference signals R-Y and B-Y into a digital video signal VD (=Y+S+C; S is a synchronizing signal and C is a chroma signal). The digital video signal VD outputted from the encoder unit 860 is supplied to a not-shown camera-signal output unit further at a post-stage and served for monitor output, data recording in a recording medium, and the like. In this case, when necessary, the digital video signal VD is converted into an analog video signal V by DA conversion.

The camera control unit 900 according to this embodiment includes a microprocessor 902, which forms a core of a computer, represented by a CPU (Central Processing Unit) in which functions of arithmetic operations and control performed by the computer are integrated in a micro integrated circuit, a ROM (Read Only Memory) 904 that is a storing unit exclusively used for readout, a RAM (Random Access Memory) 906 in which data can be written and from which data can be read out at random and that is an example of a volatile storing unit, and other peripheral members not shown in the figure. The microprocessor 902, the ROM 904, and the RAM 906 are collectively referred to as microcomputer as well.

The "volatile storing unit" means a storing unit from which stored contents are erased when a power supply of the apparatus is turned off. On the other hand, a "nonvolatile storing unit" means a storing unit that continues to hold stored contents even if a main power supply of the apparatus is turned off. The nonvolatile storing unit only has to be capable of continuing to hold stored contents and is not limited to one in which a memory element itself made of a semiconductor has non-volatility. The nonvolatile storing unit may be a storing unit in which a volatile memory element is formed to assume "non-volatility" by providing a backup power supply. The nonvolatile storing unit is not limited to be formed by the memory element made of the semiconductor and may be formed by using a medium such as a magnetic disk or an optical disk. For example, a hard disk device can be used as the nonvolatile storing unit. A storing unit adopting a configuration for reading out information from a recording medium such as a CD-ROM can be used as the nonvolatile storing unit.

The camera control unit 900 controls the entire system. In particular, in a relation with processing for controlling the influence of fluctuation in pixel signal voltage for each pixel during pixel reset period when it is determined whether a blackening phenomenon occurs, the camera control unit 900 has a function of adjusting on/off timing and setting values of various control pulses for control of generation of the reference signal SLP_SUN and control of initialization for the comparing unit for blackening phenomenon determination. A control program for the camera control unit 900 and the like are stored in the ROM 904. In particular, in this example, a program for setting on/off timing of various control pulses with the camera control unit 900 is stored in the ROM 904. Data and the like used by the camera control unit 900 to perform various kinds of processing are stored in the RAM 906.

A recording medium 924 such as a memory card can be detachably inserted into the camera control unit 900. The camera control unit 900 can be connected to a communication network such as the Internet. For example, the camera control unit 900 includes, besides the microprocessor 902, the ROM 904, and the RAM 906, a memory readout unit 907 and a communication I/F (interface) 908.

The recording medium 924 is used for registering program data for causing the microprocessor 902 to perform software processing and various data such as setting values of a convergence range of photometric data DL based on a luminance signal from the luminance-signal processing unit 840 and on/off timing of various control pulses for exposure control processing (including electronic shutter control), control of generation of the reference signal SLP_SUN, and control of initialization for the comparing unit for blackening phenomenon determination.

The memory readout unit 907 stores (installs) data read out from the recording medium 924 in the RAM 906. The communication I/F 908 mediates exchange of communication data between the apparatus and the communication network such as the Internet.

In such an imaging apparatus 8, the driving control unit 7 and the column processing unit 26 are shown as module-like units separate from the pixel array unit 10. However, as described about the solid-state imaging device 1, it goes without saying that the one-chip solid-state imaging device 1 in which these units are integrally formed on a semiconductor substrate on which the pixel array unit 10 is formed may be used. In the figure, the imaging apparatus 8 is shown as including, besides the pixel array unit 10, the driving control unit 7, the column processing unit 26, the reference-signal generating unit 27, the camera-signal processing unit 810, the blackening detecting unit 400 related to blackening phenomenon detection and data correction, the reference-signal generating unit 460, the data-storage control unit 500, and optical systems such as an photographing lens 802, an optical low-pass filter 804, or an infrared cut filter 805. This form is suitable for a module-like form having an imaging function in which these units are collectively packaged.

In a relation with the module in the solid-state imaging device 1, as shown in the figure, the solid-state imaging device 1 may be provided in a module-like form having the imaging function packaged with following components: the pixel array unit 10 (the imaging unit), signal processing units (excluding the camera-signal processing unit at the post-stage of the column processing unit 26) composed of the column processing unit 26 having the AD conversion function and the difference (CDS) processing function, which is closely related to the pixel array unit 10, and the function units related to blackening phenomenon determination and data correction. The camera-signal processing unit 810, which is the remaining signal processing unit, may be provided at a post-stage of the solid-state imaging device 1, which is provided in the module-like form, to configure the entire imaging apparatus 8.

Alternatively, although not shown in the figure, the solid-state imaging device 1 may be provided in a module-like form having the imaging function in which the pixel array unit 10 and the optical systems such as the photographing lens 802 are collectively packaged. The entire imaging apparatus 8 may be configured by providing the camera 810 in the module in addition to the solid-state imaging device 1 provided in the module form. In the module form of the solid-state imaging device 1, the camera-signal processing unit 810 equivalent to a camera-signal processing unit 200 may be included. In this case, practically, the solid-state imaging device 1 and the imaging apparatus 8 can be regarded identical. Such an imaging apparatus 8 is provided as, for example, a portable apparatus having a camera and an imaging function for performing "imaging". "Imaging" includes not only capturing of images during normal camera photographing but also fingerprint detection and the like in a broader sense.

The imaging apparatus 8 having such structure has all the functions of the solid-state imaging device 1. Basic structure and operations of the imaging apparatus 8 can be set the same as those of the solid-state imaging device 1. It is possible to realize a mechanism for performing initialization for setting a determination level suitable for each of unit pixels when it is determined whether a blackening phenomenon occurs, and when a blackening phenomenon is detected, to realize a mechanism for fixing a comparison output from the comparing unit for AD conversion to a state before starting comparison.

The present invention has been explained with reference to the embodiments. However, the technical scope of the present invention is not limited to the scope described in the embodiment. Various modifications and improvements of the embodiments are possible without departing from the spirit of the invention. Forms modified and improved through such modifications and improvements are also included in the technical scope of the present invention.

The embodiments do not limit to the inventions according to claims. All combinations of characteristics explained in the embodiments are not always indispensable for the solving means of the present invention. Inventions at various stages are included in the embodiments. Various inventions can be extracted by appropriate combinations of plural disclosed elements. Even if several elements are deleted from all the elements described in the embodiment, the elements from which the several elements are deleted can be extracted as inventions as long as effects are obtained.

In the embodiments, for example, in order to adjust the determination level V_det for a blackening phenomenon according to the pixel signal voltage Vx during pixel reset period, the pixel signal voltage Vx and the reference signal SLP_SUN are inputted to the comparing unit 401 by coupling capacitance and an initialization operation for short-circuiting an input and an output of the comparing unit 401 when the reference signal SLP_SUN is at the initial value level V_ini and for setting the initial value level V_ini and the pixel signal voltage Vx during pixel reset period to the same level is performed. However, the present invention is not limited to such an operation. Any operation may be adopted as long as it is an operation of a mechanism for setting a determination level suitable for each unit pixel such that, even if a pixel signal voltage of reset pixels fluctuates for each the unit pixel, the influence of the fluctuation can be reduced.

For example, a function unit that measures the pixel signal voltage Vx during pixel reset period for each of the unit pixels 3 and a function unit that adjusts the determination level V_det for each of the unit pixels 3 on the basis of a result of the measurement may be provided.

It should be understood by those skilled in the art that various modifications, combinations, sub-combinations, and alterations may occur depending on design requirements and other factors insofar as they are within the scope of the appended claims or the equivalents thereof.

What is claimed is:

1. A solid-state imaging device comprising:
   a pixel array unit configured by arranging unit pixels including charge generating units and output transistors that output processing object signals corresponding to charges generated by the charge generating units;
   an imaging-condition determining unit that compares a determination level suitable for each of the unit pixels with the processing object signals outputted from the unit pixels to determine whether a large light-amount imaging condition, when an amount of light larger than that of light representing a saturation level is made incident on the charge generating units, is satisfied;
   a control unit that performs control, on condition that the imaging-condition determining unit determines that the large light-amount imaging condition is satisfied, to correct an output signal based on the processing object signals outputted from the unit pixels such that a harmful effect due to the large light-amount imaging condition is suppressed in the output signal; and
   a reference-signal generating unit that generates a reference signal having an initial value for determining whether the large light-amount imaging condition is satisfied and the determination level in time series,
   wherein,
      the imaging-condition determining unit includes a comparing unit that compares the reference signal generated by the reference-signal generating unit with signals outputted from the unit pixels, and
      the imaging-condition determining unit resets, in a period in which the reference signal is at the initial value, the comparing unit to an operation reference value for reading out the processing object signals to set the determination level suitable for each of the unit pixels and, then, performs a comparison processing in a period in which the reference signal is at the determination level.

2. A solid-state imaging device according to claim 1, wherein:
   the processing object signals outputted from the unit pixels represent, in time series, a reference component due to pixel reset and a signal component corresponding to an electric charge generated by the charge generating units, and
   the imaging-condition determining unit supplies the determination level to the comparing unit to perform a first comparison processing for comparison with the reference component with a reset processing of the comparing unit for the reference component before performing said first comparison processing and supplies the determination level to the comparing unit to perform a second comparison processing for comparison with the signal component without a reset processing of the comparing unit for the signal component before said second comparison processing.

3. A solid-state imaging device according to claim 2, wherein the comparing unit includes:
   a differential transistor portion in the form of a differential transistor pair connected by first and second transistors, the first transistor having an input terminal, to which the processing object signals are input by capacitive coupling, and an output terminal, and the second transistor having an input terminal, to which the reference signal is input by capacitive coupling, and an output terminal; and
   an operating-point resetting unit to which the input terminals and the output terminals of the first and second transistors can be connected, the operating-point resetting unit performing the reset processing,
   wherein,
      in the comparison processing for the reference component, the comparing unit performs the reset by controlling the operating-point resetting unit to temporarily connect the input terminals and the output terminals of the first and second transistors.

4. A solid-state imaging device comprising:
   a pixel array unit configured by arranging unit pixels including charge generating units and output transistors that output processing object signals corresponding to charges generated by the charge generating units;
   an imaging-condition determining unit that compares a determination level suitable for each of the unit pixels with the processing object signals outputted from the unit pixels to determine whether a large light-amount imaging condition, when an amount of light larger than that of light representing a saturation level is made incident on the charge generating units, is satisfied;
   a control unit that performs control, on condition that the imaging-condition determining unit determines that the large light-amount imaging condition is satisfied, to correct an output signal based on the processing object signals outputted from the unit pixels such that a harmful effect due to the large light-amount imaging condition is suppressed in the output signal;
   an AD conversion unit including a second comparing unity; and
   a counter unit to acquire the digital data of the processing object signals,
   wherein,
      said second comparing unit compares the processing object signals with a reference signal for AD conversion, a value of which gradually changes, for converting analog processing object signals outputted from the unit pixels into the digital data;
      said counter unit performs count processing in a designated count-operation-enabled period and holds a count value at a point when the count processing is completed, and
      the control unit corrects, on condition that the imaging-condition determining unit determines that the large light-amount imaging condition is satisfied, a comparison output from the second comparing unit to a state same as that before the start of a comparison, applies the count processing in the counter unit in a count-operation-enabled period defined by a comparison result after the correction, holds the count value in the counter unit, and performs the correction of the output signal using the count value held in the counter unit.

5. An imaging apparatus comprising:
a pixel array unit configured by arranging unit pixels including charge generating units and output transistors that output processing object signals corresponding to charges generated by the charge generating units;
an imaging-condition determining unit that compares a determination level suitable for each of the unit pixels with the processing object signals outputted from the unit pixels to determine whether a large light-amount imaging condition, when an amount of light larger than that of light representing a saturation level is made incident on the charge generating units is satisfied;
a control unit that performs control, on condition that the imaging-condition determining unit determines that the large light-amount imaging condition is satisfied, to correct an output signal based on the processing object signals outputted from the unit pixels such that a harmful effect due to the large light-amount imaging condition is suppressed in the output signal;
a main control unit that controls the control unit;
a reference-signal generating unit that generates a reference signal having an initial value for determining whether the large light-amount imaging condition is satisfied and the determination level in time series,
wherein,
the imaging-condition determining unit includes a comparing unit that compares the reference signal generated by the reference-signal generating unit with signals outputted from the unit pixels, and
the imaging-condition determining unit resets, in a period in which the reference signal is at the initial value, the comparing unit to an operation reference value for reading out the processing object signals to set the determination level suitable for each of the unit pixels and, then, performs a comparison processing in a period in which the reference signal is at the determination level.

* * * * *